(12) United States Patent
Jung et al.

(10) Patent No.: US 11,232,305 B2
(45) Date of Patent: Jan. 25, 2022

(54) METHOD FOR OUTPUTTING CONTENT CORRESPONDING TO OBJECT AND ELECTRONIC DEVICE THEREFOR

(71) Applicant: SAMSUNG ELECTRONICS CO., LTD., Suwon-si (KR)

(72) Inventors: Yumin Jung, Suwon-si (KR); Seoyoung Lee, Suwon-si (KR); Moojung Kim, Seongnam-si (KR); Bado Lee, Seongnam-si (KR); Daehee Kim, Suwon-si (KR); Dae-Kyu Shin, Suwon-si (KR); Sungdae Cho, Yongin-si (KR); Ji-Yoon Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/609,018

(22) PCT Filed: Jan. 18, 2018

(86) PCT No.: PCT/KR2018/000861
§ 371 (c)(1),
(2) Date: Oct. 28, 2019

(87) PCT Pub. No.: WO2018/199432
PCT Pub. Date: Nov. 1, 2018

(65) Prior Publication Data
US 2020/0143166 A1    May 7, 2020

(30) Foreign Application Priority Data
Apr. 28, 2017    (KR) .................. 10-2017-0055768

(51) Int. Cl.
*G06K 9/00*    (2006.01)
*G06K 7/14*    (2006.01)
(Continued)

(52) U.S. Cl.
CPC ....... *G06K 9/00671* (2013.01); *G06K 7/1413* (2013.01); *G06K 7/1417* (2013.01);
(Continued)

(58) Field of Classification Search
CPC combination set(s) only.
See application file for complete search history.

(56) References Cited

U.S. PATENT DOCUMENTS 9,002,831 B1    4/2015   O'Malley et al.
2008/0279481 A1   11/2008   Ando
(Continued)

FOREIGN PATENT DOCUMENTS

JP    2005-215922    8/2005
KR    10-2011-0008980    1/2011
(Continued)

OTHER PUBLICATIONS

Extended Search Report dated Jan. 10, 2020 in counterpart European Patent Application No. EP18789841.6.
(Continued)

*Primary Examiner* — Zhiyu Lu
(74) *Attorney, Agent, or Firm* — Nixon & Vanderhye, P.C.

(57) ABSTRACT

Various embodiments of the present invention relate to an apparatus and a method for outputting, from an electronic device, at least one piece of content corresponding to an object included in an image, wherein the electronic device comprises: a camera; a display; at least one processor; and a memory electrically connected to at least one processor, and the memory can store, when being executed, instructions for causing at least one processor to: acquire an image including the object through the camera; confirm first information related to a shape of the object through a first area corresponding to the object in the image; confirm second
(Continued)

information related to additional information on the object through a second area in the image; and provide, through the display, at least one content corresponding to the first information acquired from an external device on the basis of at least the first information and the second information. Other embodiments are possible.

14 Claims, 24 Drawing Sheets

(51) Int. Cl.
  *G06K 9/46* (2006.01)
  *G06Q 10/08* (2012.01)
(52) U.S. Cl.
  CPC ........... *G06K 9/46* (2013.01); *G06K 2209/01* (2013.01); *G06Q 10/087* (2013.01)

(56) References Cited

U.S. PATENT DOCUMENTS

| | | | |
|---|---|---|---|
| 2011/0125735 A1 | 5/2011 | Petrou | |
| 2013/0136363 A1 | 5/2013 | Na | |
| 2014/0046944 A1* | 2/2014 | Zhou | G06F 16/5866 707/737 |
| 2016/0217157 A1 | 7/2016 | Shih et al. | |
| 2017/0278166 A1* | 9/2017 | Jeong | G06K 9/6204 |

FOREIGN PATENT DOCUMENTS

| | | |
|---|---|---|
| KR | 10-2011-0123380 | 11/2011 |
| KR | 10-2012-0014480 | 2/2012 |
| KR | 10-2015-0044498 | 4/2015 |
| KR | 10-2016-0092045 | 8/2016 |
| KR | 10-1699765 | 1/2017 |

OTHER PUBLICATIONS

Tsai, Sam S., et al., "Combining Image and Text Features: A Hybrid Approach to Mobile Book Spine Recognition," Proceedings of the 19th ACM International Conference on Multimedia, MM '11, Nov. 28, 2011, pp. 1029-1032.
Tsai, Sam S., et al., "Visual Text Features for Image Matching," 2012 IEEE International Symposium on Multimedia, IEEE, Dec. 10, 2012, pp. 408-412.
International Search Report for PCT/KR2018/000861, dated Apr. 27, 2018, 5 pages.
Written Opinion of the ISA for PCT/KR2018/000861, dated Apr. 27, 2018, 8 pages.
Communication pursuant to Article 94(3) EPC dated Jun. 8, 2021 in counterpart European Patent Application No. 18789841.6.
Examination Report dated Jun. 21, 2021 in counterpart Indian Patent Application No. 201927045259 and English-language translation.
Notice of Preliminary Rejection dated Jul. 26, 2021 in counterpart Korean Patent Application No. KR10-2017-0055768 and English-language translation.

* cited by examiner

METHOD FOR OUTPUTTING CONTENT CORRESPONDING TO OBJECT AND ELECTRONIC DEVICE THEREFOR

This application is the U.S. national phase of International Application No. PCT/KR2018/000861 filed 18 Jan. 2018, which designated the U.S. and claims priority to KR Patent Application No. 10-2017-0055768 filed 28 Apr. 2017, the entire contents of each of which are hereby incorporated by reference.

Technical Field

Various embodiments of the present invention relate to an apparatus and a method for outputting at least one content corresponding to an object included in an image in an electronic device.

BACKGROUND ART

With development of information communication technology and semiconductor technology, various electronic devices provide various functions. For example, the various functions may include a voice call service, a message service, a broadcasting service, a wireless Internet service, a camera service and a multimedia service such as music playback service.

The electronic device may provide a search service to enhance user's convenience. The search service may include a service for retrieving product information corresponding to a barcode or quick response (QR) code acquired through a camera of the electronic device.

SUMMARY

An electronic device may provide a search service using an object image which is set for information retrieval such as a barcode or a quick response (QR) code. Accordingly, a target for providing the search service may be limited to an object which is set for the information retrieval.

Since the electronic device outputs search results related to the object image, a user of the electronic device may not obtain his/her desired information related to the object.

Various embodiments of the present invention may provide an apparatus and a method for displaying a content corresponding to at least one object included in an image in an electronic device.

According to various embodiments of the present invention, an electronic device may include a camera, a display, at least one processor, and a memory electrically coupled with the at least one processor, wherein the memory may store instructions, when executed, which cause the at least one processor to acquire an image including an object through the camera, identify first information relating to a shape of the object through a first area corresponding to the object in the image, identify second information relating to additional information of the object through a second area in the image, and provide at least one content corresponding to the first information obtained from a server through the display, based at least on the first information and the second information.

According to various embodiments of the present invention, an operating method of an electronic device may include acquiring an image including an object through a camera electrically coupled with the electronic device, identifying first information relating to a shape of the object through a first area corresponding to the object in the image, identifying second information relating to additional information of the object through a second area in the image, obtaining at least one content corresponding to the first information from an external device, and displaying at least one content corresponding to the first information, based at least on the first information and the second information.

According to various embodiments of the present invention, an electronic device may include a communication interface, a memory including a plurality of storage areas, and at least one processor electrically coupled with the memory, wherein the memory may store instructions, when executed, which cause the at least one processor to receive an image from an external device, via the communication interface, identify first information relating to a shape of the object through a first area corresponding to the object in the image, identify second information relating to additional information of the object through a second area in the image, rank at least one content corresponding to the first information among the plurality of the contents, based at least on the first information and the second information, and transmit the ranked at least one content corresponding to the first information to the external device via the communication interface.

According to various embodiments of the present invention, an electronic device may include a communication interface, a memory including a plurality of storage areas, and at least one processor electrically coupled with the memory, wherein the memory may store instructions, when executed, which cause the at least one processor to receive an image from an external device, via the communication interface, identify first information relating to a shape of the object through a first area corresponding to the object in the image, identify second information relating to additional information of the object through a second area in the image, select at least one content corresponding to the first information among the plurality of the contents, and transmit the selected at least one content corresponding to the first information to the external device via the communication interface.

According to various embodiments of the present invention, an operating method of an electronic device may include receiving an image from an external device, identifying first information relating to a shape of the object through a first area corresponding to the object in the image, identifying second information relating to additional information of the object through a second area in the image, obtaining at least one content corresponding to the first information, ranking at least one content corresponding to the first information among the plurality of the contents, based at least on the first information and the second information, and transmitting the ranked at least one content corresponding to the first information to the external device via the communication interface.

DETAILED DESCRIPTION OF EXAMPLE EMBODIMENTS

Figure 1A:
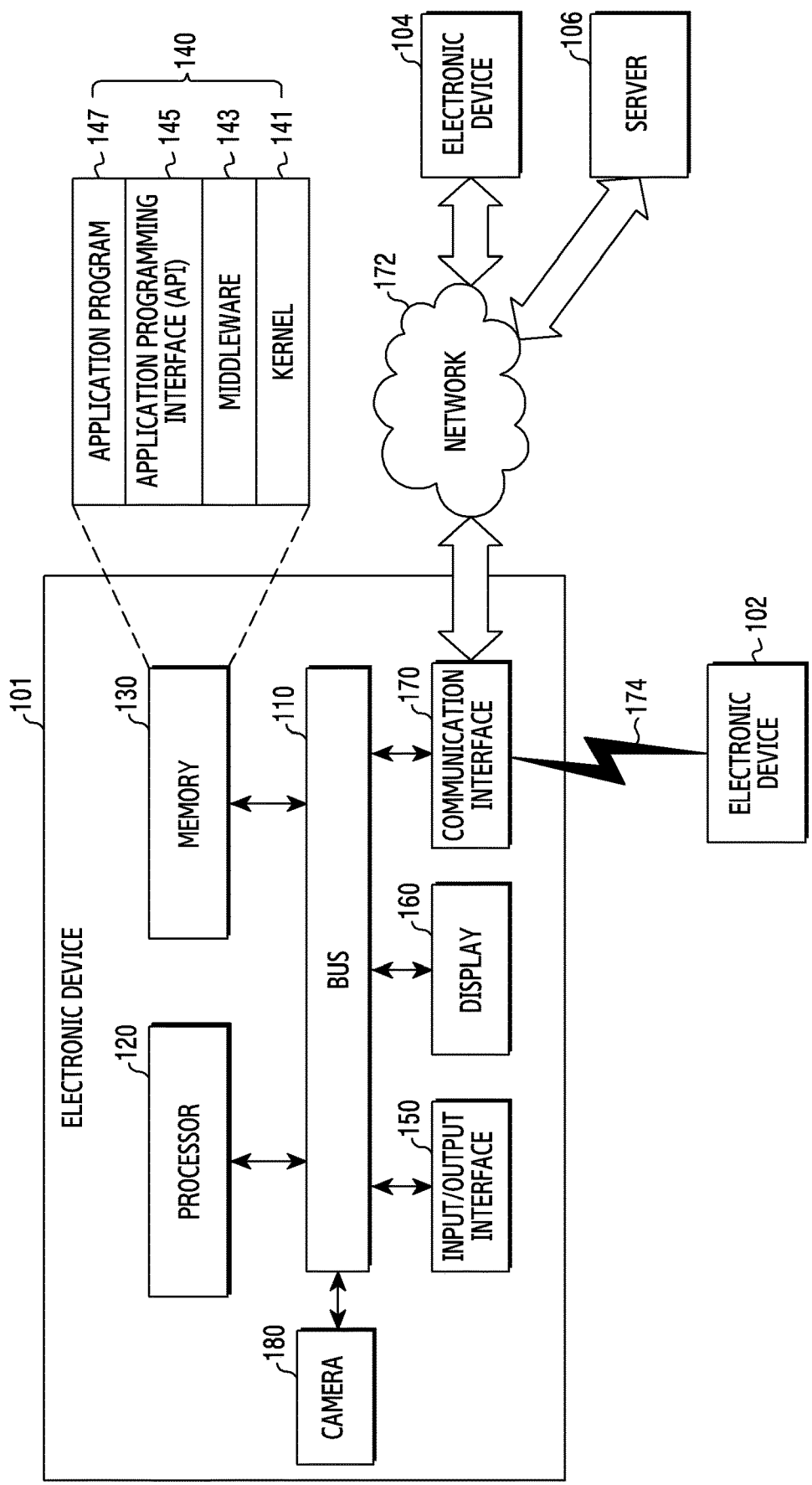
FIG. 1A illustrates an electronic device in a network environment in various embodiments of the present invention.

Hereinafter, various embodiments of the present disclosure will be described with reference to the accompanying drawings. Various embodiments and terms used herein do not limit various embodiments of the present disclosure to the particular forms, and should be understood to include various modifications, equivalents, and/or alternatives of the corresponding embodiments. In the description of the drawings, identical or similar reference numerals are used to designate identical or similar elements. It is to be understood that the singular forms may include plural referents unless the context clearly dictates otherwise.

In the present disclosure, an expression such as "A or B," or "at least one of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be at a dedicated processor (such as an embedded processor) for performing a corresponding operation or a generic-purpose processor (such as a Central Processing Unit (CPU) or an application processor) that can perform a corresponding operation by executing at least one software program stored at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. According to embodiments of the present disclosure, the wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit.

According to an embodiment, the electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler).

According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to various embodiments, can be a flexible electronic device or a combination of two or more of the foregoing various devices. An electronic device, according to an embodiment of the present disclosure, is not limited to the foregoing devices. The term "user", as used herein, can refer to a person using an electronic device or a device using an electronic device (e.g., an artificial intelligence electronic device).

Figure 1B:
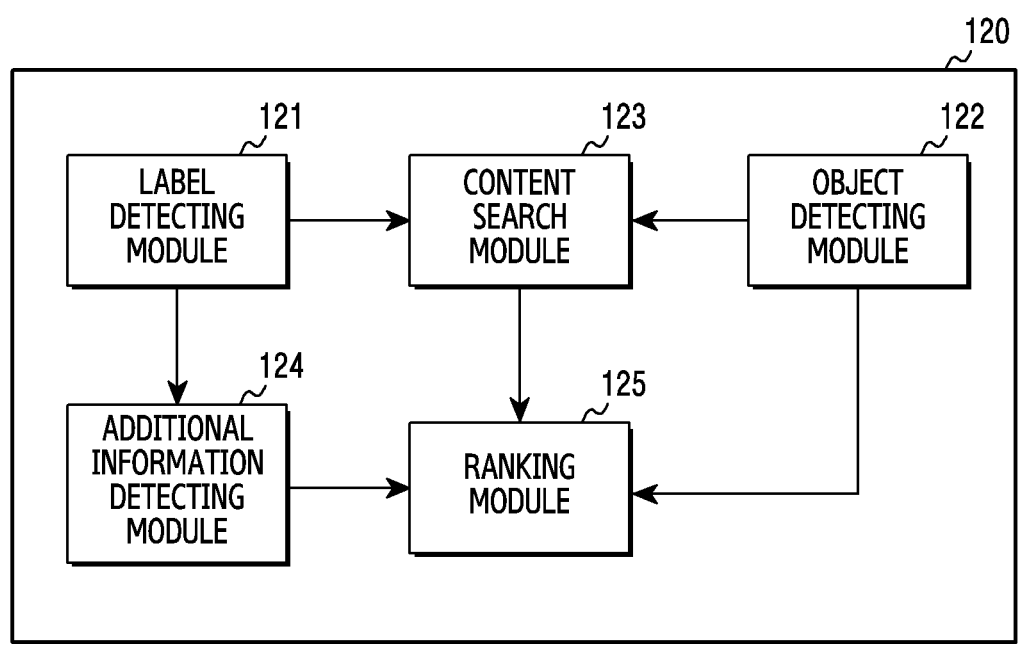
FIG. 1B illustrates a block diagram of an electronic device for providing a search service of an object in various embodiments of the present invention.
Figure 1C:
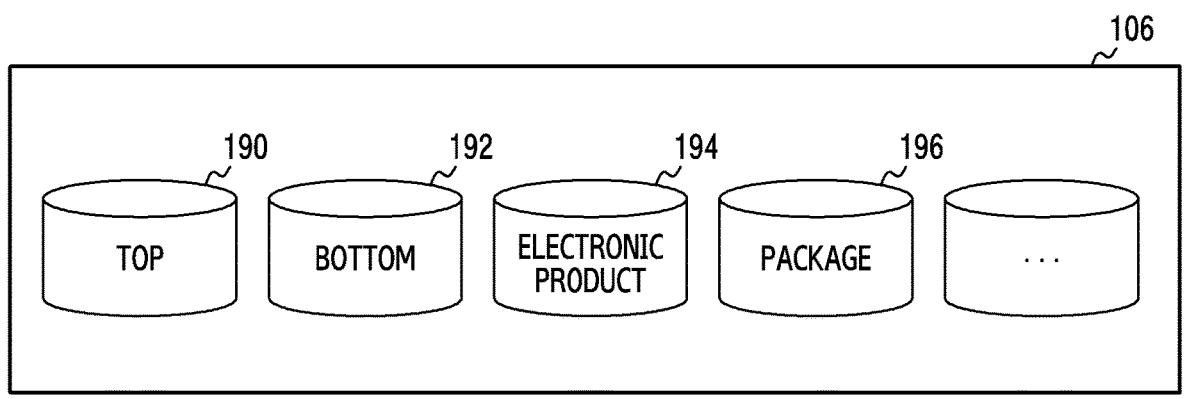
FIG. 1C illustrates a configuration of a server for storing a content corresponding to an object in various embodiments of the present invention.

FIG. 1A illustrates an electronic device 101 in a network environment in various embodiments of the present invention. FIG. 1B illustrates a block diagram of an electronic device for providing a search service of an object in various embodiments of the present invention. FIG. 1C illustrates a configuration of a server for storing a content corresponding to an object in various embodiments of the present invention.

Referring to FIG. 1A, the electronic device 101 may include a bus 110, a processor (e.g., a processing circuit) 120, a memory 130, an input/output interface (e.g., an input/output circuit) 150, a display (e.g., a display circuit 160), a communication interface (e.g., a communication circuit) 170 and a camera 180. The electronic device 101 may be provided without at least one of the components, or may include at least one additional component.

The bus 110 can include a circuit for connecting the components 120 through 180 and delivering communication signals (e.g., control messages or data) therebetween.

The processor 120 can include one or more of a CPU, an application processor (AP), a Communication Processor (CP) or an image signal processor (ISP). The processor 120, for example, can perform an operation or data processing with respect to control and/or communication of at least another component of the electronic device 101. For example, the processor 120 may provide a search service using a label detecting module 121, an object detecting module 122, a content search module 123, an additional information detecting module 124 and a ranking module 125, as shown in FIG. 1B.

According to an embodiment, the processor 120 may detect at least one object in an image displayed on the display 160. For example, the detecting module 122 of the processor 120 may extract a feature point of the image displayed on the display 160. The object detecting module 122 may detect at least one object included in the image based on the feature point of the image. For example, the object detecting module 122 may detect shape information of the object included in the image. The shape information of the object may include appearance information of the detected object based on the feature point of the object. For example, the image displayed on the display 160 may include at least one of a preview image acquired through the camera 180, a capture image, an image stored in the memory 130 or an image an image received from an external device.

According to an embodiment, the processor 120 may detect label information in the image displayed on the display 160. For example, the label detecting module 121 of the processor 120 may compare each object included in the image detected through the object detecting module 122 with a reference label. The label detecting module 121 may determine an object of which similarity with the reference label exceeds a reference similarity as the label. For example, the label detecting module 121 may extract at least one candidate object for comparing with the reference label from the objects in the image. The candidate object may be extracted based on at least one of a position, a size, a shape or a color of the object extracted from the image. For example, the label detecting module 121 may extract an object positioned inside a specific object as the candidate object. For example, the specific object may include an object selected based on a user's input among the objects in the image displayed on the display 160. According to an embodiment, the reference label may be stored in the memory 130 or the external device (e.g., the server 106).

According to an embodiment, the processor 120 may determine a search area used to provide the search service based on at least one of shape information or label information of the object included in the image. For example, the content search module 123 of the processor 120 may select at least one storage area corresponding to the shape information of the object among a plurality of available storage areas for providing the search service as at least part of the search area. The content search module 123 may limit the search area of the content corresponding to the object in at least one storage area corresponding to the shape information of the object based on the label information included in the image. For example, the content search module 123 of the processor 120 may select at least one storage area corresponding to the label information included in the image among the plurality of the available storage areas for providing the search service as at least part of the search area. The content search module 123 may limit the search area of the content corresponding to the object in at least one storage area corresponding to the label information included in the image based on the shape information of the object. For example, the plurality of the storage areas may be included in the memory 130 or the external device (e.g., server 106).

According to an embodiment, the processor 120 may retrieve at least one content corresponding to the shape information of the object included in the image, through the determined search area for providing the search service. For example, the content search module 123 of the processor 120 may detect at least one content corresponding to the shape information of the object detected by the object detecting module 122 within the search area used for providing the search service. For example, the content corresponding to the shape information of the object may include at least one content including an image of which similarity with the shape information of the object exceeds the reference similarity among the contents included in the search area.

According to an embodiment, the processor 120 may identify additional information of the object in the image acquired through the camera 180. For example, the additional information detecting module 124 of the processor 120 may detect a text included in the image through character reading (e.g., optical character reader (OCR)) on the image acquired through the camera 180. The additional information detecting module 124 may detect the text to be used as the additional information based on at least one of a size of the text (or a size of a text area) detected in the image, a keyword setting condition or a text position. For example, the keyword setting condition may include at least one of a remove text list, language constitution of the text, a valid length of the text or an add text list. The remove text list may include at least one word used universally. The add text list may include a unique product name. For example, the additional information detecting module 124 may detect a text corresponding to the label detected in the image as the additional information. For example, the additional information detecting module 124 may detect other text relating to the text included in the additional information from a thesaurus. The additional information detecting module 124 may add the other text detected from the thesaurus to the additional information of the object. For example, the thesaurus may include mapping information of words which are expressed in different languages or different forms but have the same meaning, such as "삼성 (Korean): samsung". The thesaurus may be stored in the memory 130 or the external device (e.g., server 106).

According to an embodiment, the processor 120 may rank at least one content corresponding to the shape information of the object included in the image based on the additional information of the object. For example, the ranking module 125 of the processor 120 may identify whether there is a content corresponding to the additional information of the object in the at least one content corresponding to the shape information of the object acquired by the content search module 123. The ranking module 125 may update a priority of the content corresponding to the additional information of the object to be relatively higher than a priority of other content not corresponding to the additional information of the object. The processor 120 may control the display 160 to display the at least one content corresponding to the shape of the object based on a ranking order according to the additional information of the object.

The memory 130 can include a volatile and/or nonvolatile memory. The memory 130, for example, can store commands or data relating to at least another component of the electronic device 101. According to an embodiment, the memory 130 may store the keyword setting condition used to determine the additional information of the object.

According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS).

The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control.

The input/output interface 150, for example, can deliver commands or data inputted from a user or another external device to other component(s) of the electronic device 101, or output commands or data inputted from the other component(s) of the electronic device 101 to the user or another external device. For example, the input/output interface 150 may include at least one physical button such as a home button, a power button and a volume control button. For example, the input/output interface 150 may include a speaker for outputting an audio signal and a microphone for collecting an audio signal.

The display 160 can display various content (e.g., text, image, video, icon, and/or symbol, etc.) to a user. The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), light fidelity (LiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

According to an embodiment, the server 106 may include at least one storage area for the search service of the electronic device 101. For example, the server 106 may include a plurality of storage areas such as a top 190, a bottom 192, an electronic product 194 or a package 196 divided based on the shape or a purpose of the object, as shown in FIG. 1C. For example, the storage area may include at least one reference image for providing the search service and product information corresponding to the reference image. For example, the reference image may include at least one representative image for indicating the content (e.g., the product).

The camera 180 may capture a still image (photograph) and a moving image by collecting information of a subject. For example, the camera 180 may capture the subject according to control of the processor 120. The camera 180 may forward the captured data (e.g., an image) to the display 160 and the processor 120. For example, the camera 180 may include at least one of at least one image sensor, a lens, an image signal processor (ISP), or a flash (e.g., LED or xenon lamp, etc.). For example, the image sensor may be implemented with a charged coupled device (CCD) or a complementary metal-oxide semiconductor (CMOS). According to an embodiment, the camera 180 may include a plurality of cameras. For example, the camera 180 may include a plurality of cameras disposed at front or back of the electronic device 101. For example, the camera 180 may include a plurality of cameras disposed at the back of the electronic device 101.

According to various embodiments of the present invention, the server for providing the search service for the object included in the image may include at least some of the components of the electronic device 101 of FIG. 1A. For example, the server may include the bus 110, the processor 120, the memory 130 and the communication interface 170 shown in FIG. 1A. The same functions as the bus 110, the processor 120, the memory 130 and the communication interface 170 FIG. 1A are omitted in the following descriptions.

According to an embodiment, the processor 120 of the server may detect at least one object in the image received from an external device (e.g., other electronic device). For example, the detecting module 122 of the processor 120 may detect at least one object by extracting a feature point of the image received via the communication interface 170. For example, the object detecting module 122 may detect shape information of the object included in the image.

According to an embodiment, the processor 120 of the server may detect label information from the image received from the external device (e.g., other electronic device).

According to an embodiment, the processor 120 of the server may identify additional information of the object in the image received from the external device (e.g., other electronic device). For example, the additional information detecting module 124 of the processor 120 may detect a text in the image through the OCR on the image received via the communication interface 170.

According to an embodiment, the processor 120 of the server may control the communication interface 170 to transmit at least one content ranked based on the shape information and the additional information of the object included in the image to the external device (e.g., other electronic device). For example, the ranking module 125 of the processor 120 may update the priority of at least one content corresponding to the shape information of the object obtained by the content search module 123 based on the additional information of the object. The processor 120 may control the communication interface 170 to transmit the at least one content corresponding to the shape of the object including the priority updated based on the additional information of the object to the external device.

According to an embodiment, the external device may transmit the image displayed on a display of the external device to the server. For example, the image displayed on the display may include at least one of a preview image obtained by a camera, a captured image, an image stored in a memory of the external device or an image received from other external device.

According to an embodiment, the external device may receive at least one content corresponding to the image from the server via the communication interface. The external device may display the at least one content corresponding to the image in at least a partial area of the display based on priority information received from the server. For example, the at least one content corresponding to the image may include at least one content corresponding to the shape of the object in the image. The priority information may include a display order of the at least one content corresponding to the shape of the object which is set at the server based on the additional information of the object.

Figure 2:
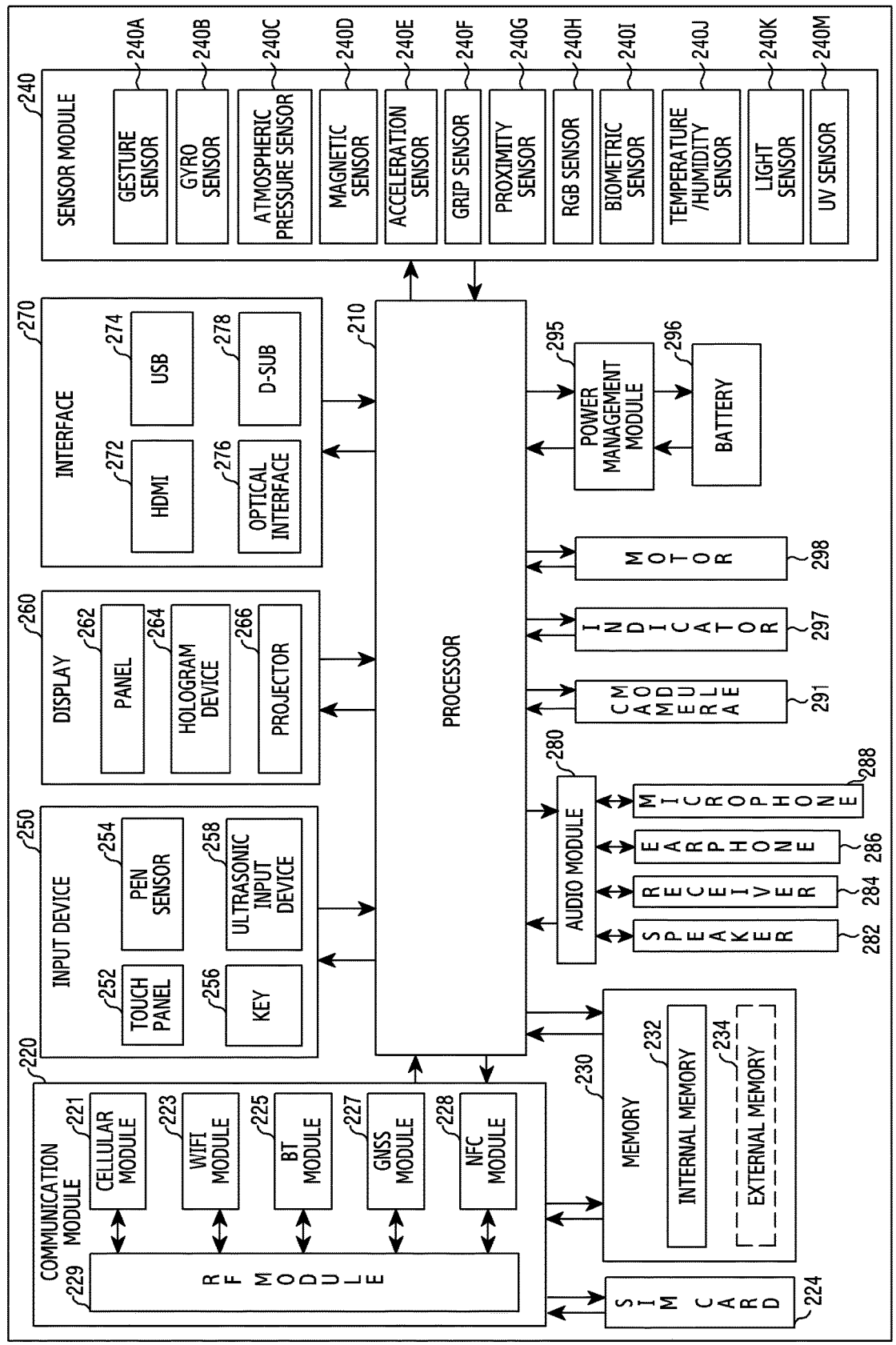
FIG. 2 illustrates a block diagram of an electronic device according to various embodiments of the present invention.

FIG. 2 is a block diagram of an electronic device 201 according to an embodiment of the present disclosure. The electronic device 201, for example, can include all or part of the above-described electronic device 101 of FIG. 1A. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

According to an embodiment, the processor 210 can control the display 260 to display at least one content corresponding to object detected from the image. For example, the processor 210 can rank at least one content corresponding to shape information of the object based on additional information of the object detected from the image. The processor 210 can control the display 260 to display at least one content ranked based on the additional information of the object. For example, the image can include at least one of a preview image obtained through the camera 291, a captured image, an image stored in the memory 230, or an image received from an external device.

The communication module 220 can have the same or similar configuration to the communication interface 170 of FIG. 1A. The communication module 220 can include, for example, the cellular module 221, a WiFi module 223, a Bluetooth (BT) module 225, a GNSS module 227, an NFC module 228, and an RF module 229.

The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP.

At least some (e.g., two or more) of the cellular module 221, the WiFi module 223, the BT module 225, the GNSS module 227, and the NFC module 228 can be included in one Integrated Circuit (IC) or an IC package.

The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130 of FIG. 1A) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1A. Additionally or alternatively, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1A. The audio module 280 can process sound information inputted or outputted through a speaker 282, a receiver 284, an earphone 286, or the microphone 288. The camera module 291 (e.g., the camera module 180 of FIG. 1A), as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging.

The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
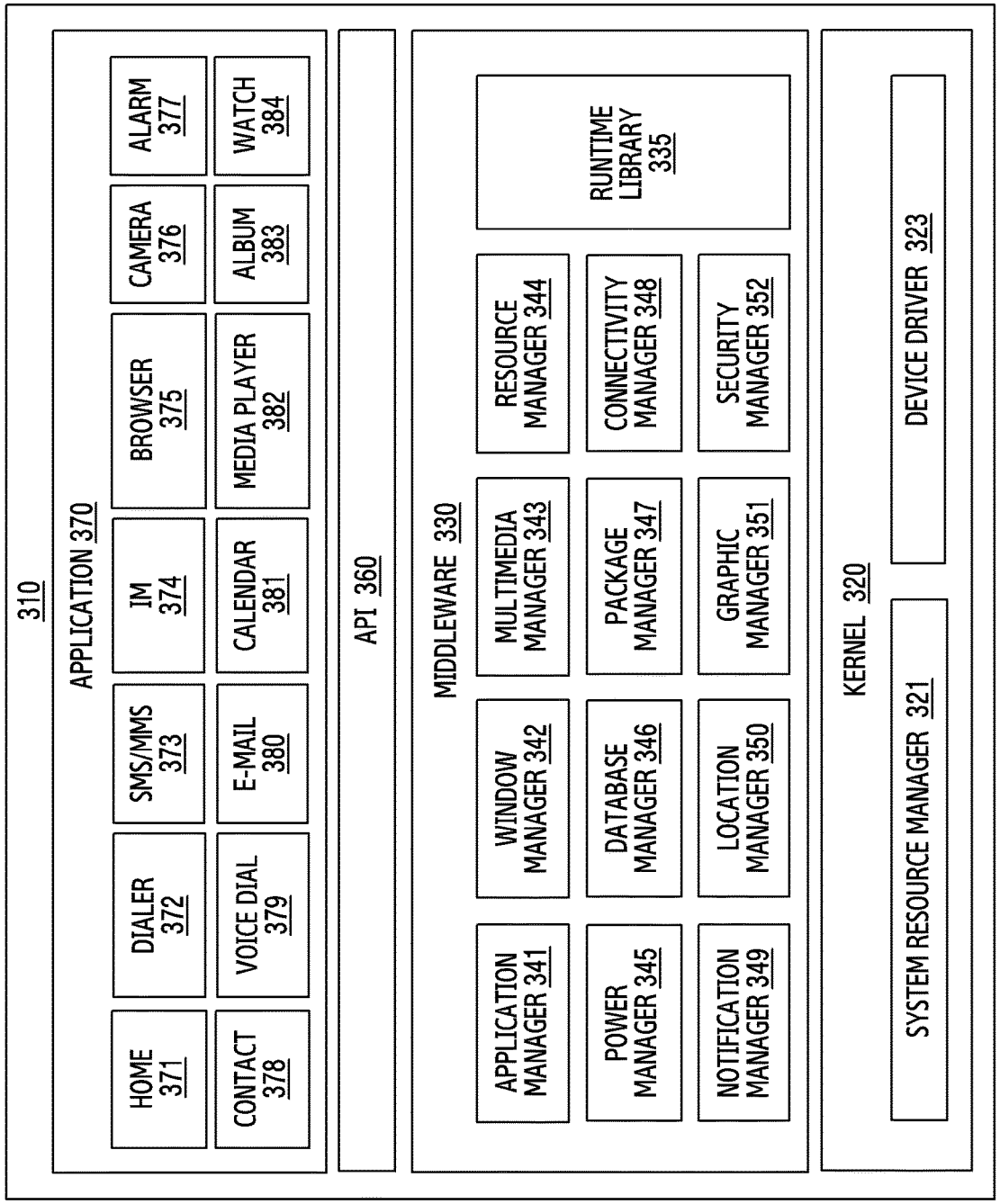
FIG. 3 illustrates a block diagram of a program module according to various embodiments of the present invention.

FIG. 3 is a block diagram of a program module according to an embodiment of the present disclosure. A program module 310 (e.g., the program 140 of FIG. 1A) can include an OS for controlling a resource relating to an electronic device (e.g., the electronic device 101 of FIG. 1A) and/or various applications (e.g., the application program 147 of FIG. 1A) running on the OS. The OS can include, for example, Android™, iOS™, Windows™, Symbian™, Tizen™, or Bada™.

Referring to FIG. 3, the program module 310 can include a kernel 320 (e.g., the kernel 141 of FIG. 1A), a middleware 330 (e.g., the middleware 143 of FIG. 1A), an API 360 (e.g., the API 145 of FIG. 1A), and/or an application 370 (e.g., the application program 147 of FIG. 1A). At least part of the program module 310 can be preloaded on an electronic device or can be downloaded from an external electronic device (e.g., the electronic device 102, 104, or the server 106 of FIG. 1A).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver.

The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto.

The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iOS can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

According to various embodiments of the present invention, an electronic device may include a camera, a display, at least one processor, and a memory electrically coupled with the at least one processor, wherein the memory may store instructions, when executed, which cause the at least one processor to acquire an image including an object through the camera, identify first information relating to a shape of the object through a first area corresponding to the object in the image, identify second information relating to additional information of the object through a second area in the image, and provide at least one content corresponding to the first information obtained from an external device through the display, based at least on the first information and the second information.

According to various embodiments, the external device may include a plurality of storage areas, and the instructions may include instructions which cause the at least one processor to obtain at least one content corresponding to the first information from at least one storage area corresponding to at least one of shape information or label information of the object among the plurality of the storage areas.

According to various embodiments, the instructions may include instructions which cause the at least one processor to obtain at least one product identification information corresponding to the first information from the external device, and obtain detailed information corresponding to the at least one product identification information from other external device as at least part of the at least one content.

According to various embodiments, the instructions may include instructions which cause the at least one processor to detect the second information based one at least one of a text extracted from the image, a text corresponding to a label extracted from the image or a text corresponding to a shape of the object.

According to various embodiments, the instructions may include instructions which cause the at least one processor to set at least part of the text extracted from the image as the second information based on at least one of a size of a word extracted from the image, a display position of the word, the number of characters constituting the word, the number of languages included in the word, a remove word list or a distance between words.

According to various embodiments, the instructions may include instructions which cause the at least one processor to provide the at least one content through the display, based on a level at which the at least one content is associated with the first information and the second information.

According to various embodiments, the instructions may include instructions which cause the at least one processor to set a priority of the at least one content based on similarity of the at least one content and the first information, update a priority of the content corresponding to the second information among the at least one content, and display the at least one content on the display based on the updated priority.

According to various embodiments, the instructions may include instructions which cause the at least one processor to identify whether there is the content corresponding to the second information in at least one content corresponding to the first information, if there is no content corresponding to the second information, obtain at least one other content corresponding to at least part of the second information from other external device, and display the at least one content corresponding to the first information and the at least one other content on the display.

According to various embodiments, the instructions may include instructions which cause the at least one processor to display at least one content corresponding to the first information in a first area of the display, and display the at least one other content in a second area of the display.

According to various embodiments, the instructions may include instructions which cause the at least one processor to detect a redundant content in the at least one content corresponding to the first information and the at least one other content, update a priority of the redundant content among the at least one content corresponding to the first information, and display the at least one content corresponding to the first information on the display based on the updated priority.

According to various embodiments of the present invention, an electronic device (e.g., a server device) may include a communication interface, a memory for storing a plurality of storage areas, and at least one processor electrically coupled with the memory, wherein the memory may store instructions, when executed, which cause the at least one processor to receive an image from an external device, via the communication interface, identify first information relating to a shape of the object through a first area corresponding to the object in the image, identify second information relating to additional information of the object through a second area in the image, select at least one content corresponding to the first information among the plurality of the contents, based at least on the first information and the second information, and transmit the selected at least one content corresponding to the first information to the external device via the communication interface.

According to various embodiments, the instructions may include instructions which cause the at least one processor to rank at least one content corresponding to the first information, based at least on the first information and the second information, and transmit the ranked at least one content corresponding to the first information to the external device via the communication interface.

According to various embodiments of the present invention, an electronic device (e.g., a server device) may include a communication interface, a memory for storing a plurality of contents, and at least one processor electrically coupled with the memory, wherein the memory may store instructions, when executed, which cause the at least one processor to receive an image from an external device, via the communication interface, identify first information relating to a shape of the object through a first area corresponding to the object in the image, identify second information relating to additional information of the object through a second area in the image, rank at least one content corresponding to the first information among the plurality of the contents, based at least on the first information and the second information, and transmit the ranked at least one content corresponding to the first information to the external device via the communication interface.

According to various embodiments, the memory may include a plurality of storage areas, and the instructions may include instructions which cause the at least one processor to obtain at least one content corresponding to the first information from at least one storage area corresponding to at least one of shape information or label information of the object among the plurality of the storage areas.

According to various embodiments, the instructions may include instructions which cause the at least one processor to detect the second information based one at least one of a text extracted from the image, a text corresponding to a label extracted from the image or a text corresponding to a shape of the object.

According to various embodiments, the instructions may include instructions which cause the at least one processor to set at least part of the text extracted from the image as the second information based on at least one of a size of a word extracted from the image, a display position of the word, the number of characters constituting the word, the number of languages included in the word, a remove word list or a distance between words.

According to various embodiments, the instructions may include instructions which cause the at least one processor to set a priority of the at least one content based on similarity of the at least one content and the first information, update a priority of the content corresponding to the second information among the at least one content, and rank the at least one content based on the updated priority.

According to various embodiments, the instructions may include instructions which cause the at least one processor to identify whether there is the content corresponding to the second information in at least one content corresponding to the first information, if there is no content corresponding to the second information, obtain at least one other content corresponding to at least part of the second information from other external device, detect a redundant content in the at least one content corresponding to the first information and the at least one other content corresponding to at least part of the second information, update a priority of the redundant content among the at least one content corresponding to the first information, and rank the at least one content based on the updated priority.

Figure 4:
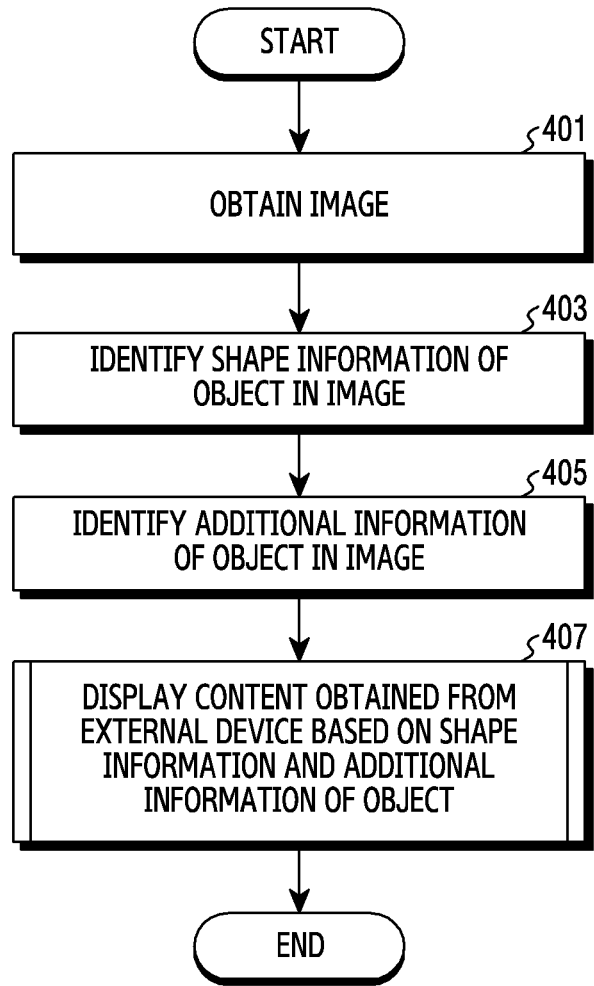
FIG. 4 illustrates a flowchart for displaying a content corresponding to an object in an electronic device according to various embodiments of the present invention.

FIG. 4 illustrates a flowchart for displaying a content corresponding to an object in an electronic device according to various embodiments of the present invention. FIG. 5A through FIG. 5E illustrate a configuration for identifying additional information of an object in an electronic device according to various embodiments of the present invention. In the following description, the electronic device may include the electronic device 101 of FIG. 1A or at least part (e.g., the processor 120) of the electronic device 101.

Referring to FIG. 4, the electronic device (e.g., the processor 120) may obtain an image for providing a search service, in operation 401. For example, the image may include at least one of a preview image obtained by the camera 180, a captured image, an image stored in the memory 130 or an image received from the external device.

The electronic device (e.g., the object detecting module 122) may identify shape information of at least one object in a first area which is at least part of the image, in operation 403. For example, the processor 120 (e.g., the object detecting module 122) may extract a feature point by analyzing the image acquired by the camera 180. The processor 120 may extract at least one object based on the feature point extracted from the image.

Figure 5A:
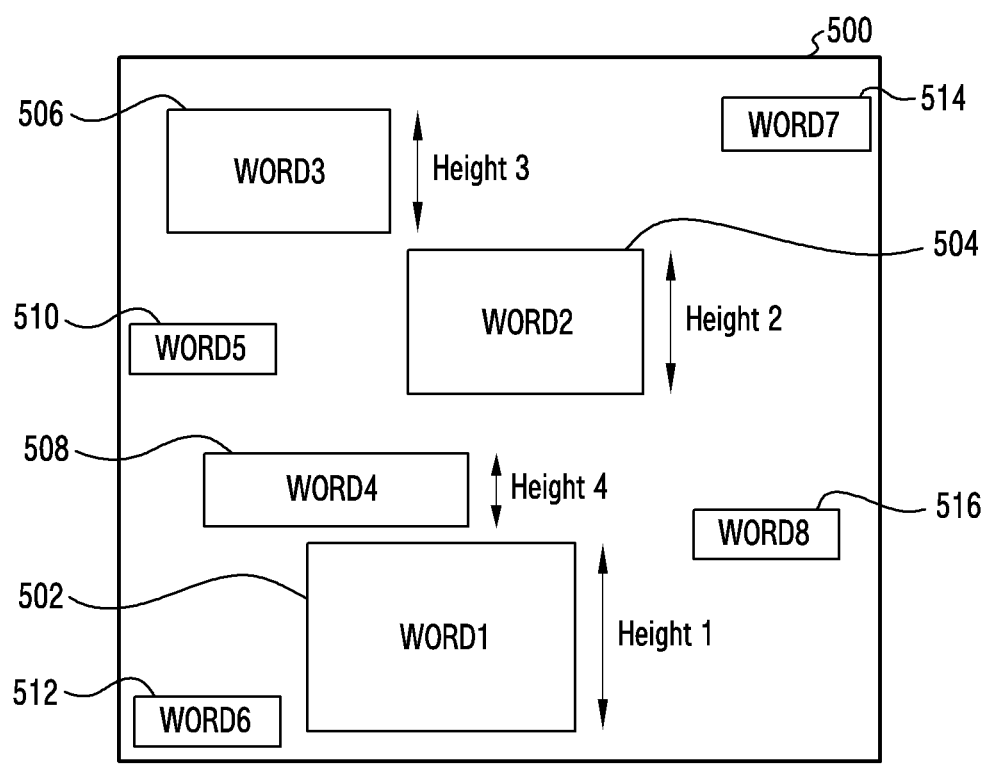
FIGS. 5A, 5B, 5C, 5D, and 5E illustrate a configuration for identifying additional information of an object in an electronic device according to various embodiments of the present invention.

The electronic device (e.g., the additional information detecting module 124) may identify additional information of the object in a second area which is at least part of the image, in operation 405. For example, the processor 120 (e.g., the additional information detecting module 124) may detect a first word 502 through an eighth word 516, through the character reading on an image 500 acquired by the camera 180, as shown in FIG. 5A. For example, character reading results may include texts detected from the image and position information of the corresponding text as shown in the following Table 1.

TABLE 1

| "description": " word 1", "boundingPoly":{ "vertices":[ { "x": 61, "y": 132 }, { "x": 81, "y": 130 }, { "x": 83, "y": 150 }, { "x": 63, "y": 152 } ] } | "description": " word 2", "boundingPoly":{ "vertices":[ { "x": 85, "y": 172 }, { "x": 129, "y": 180 }, { "x": 123, "y": 218 }, { "x": 78, "y": 210 } ] } | "description": " word 3", "boundingPoly":{ "vertices":[ { "x": 141, "y": 199 }, { "x": 154, "y": 201 }, { "x": 150, "y": 221 }, { "x": 138, "y": 219 } ] } |
| --- | --- | --- |

In Table 1, x and y may include coordinates of a vertex for indicating a rectangular area of the text extracted through the character reading.

Figure 5B:
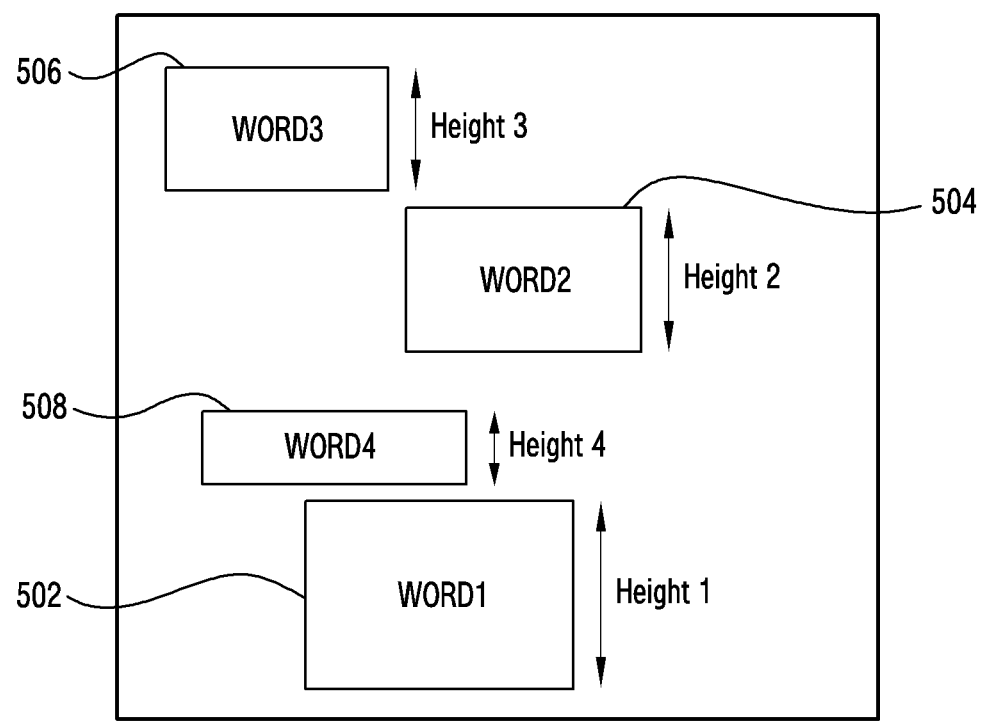
Figure 5C:
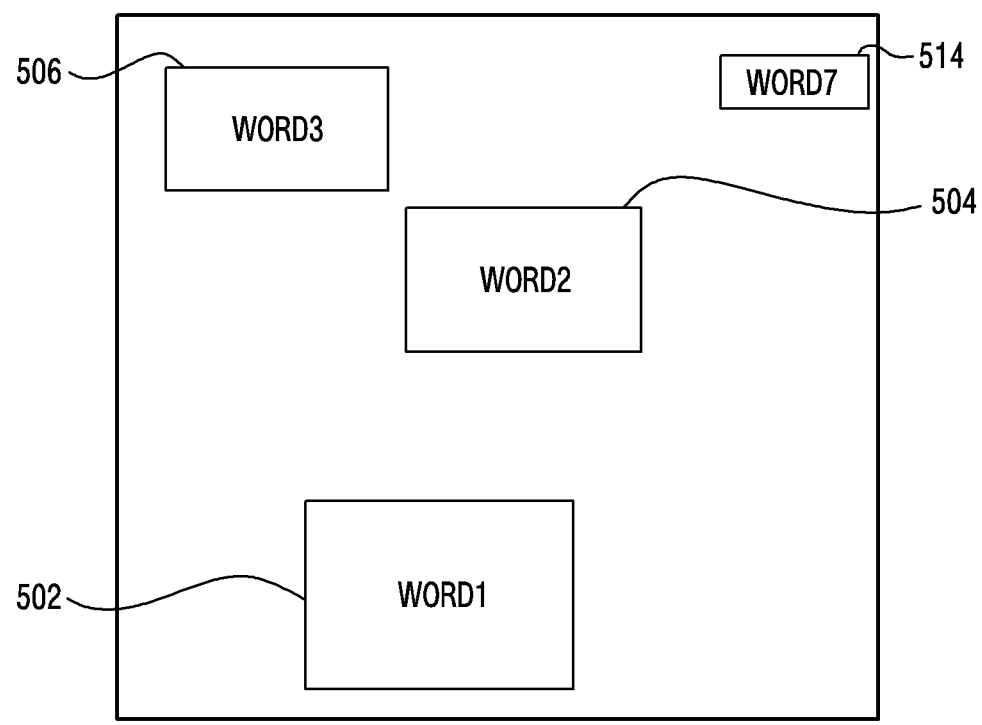
Figure 5D:
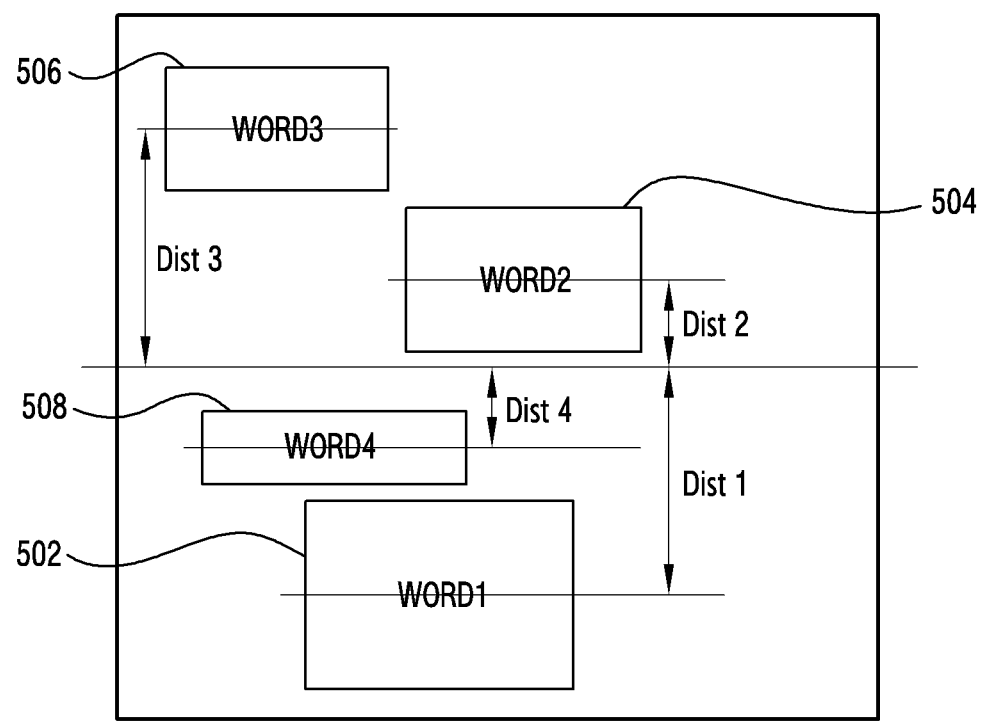
Figure 5E:
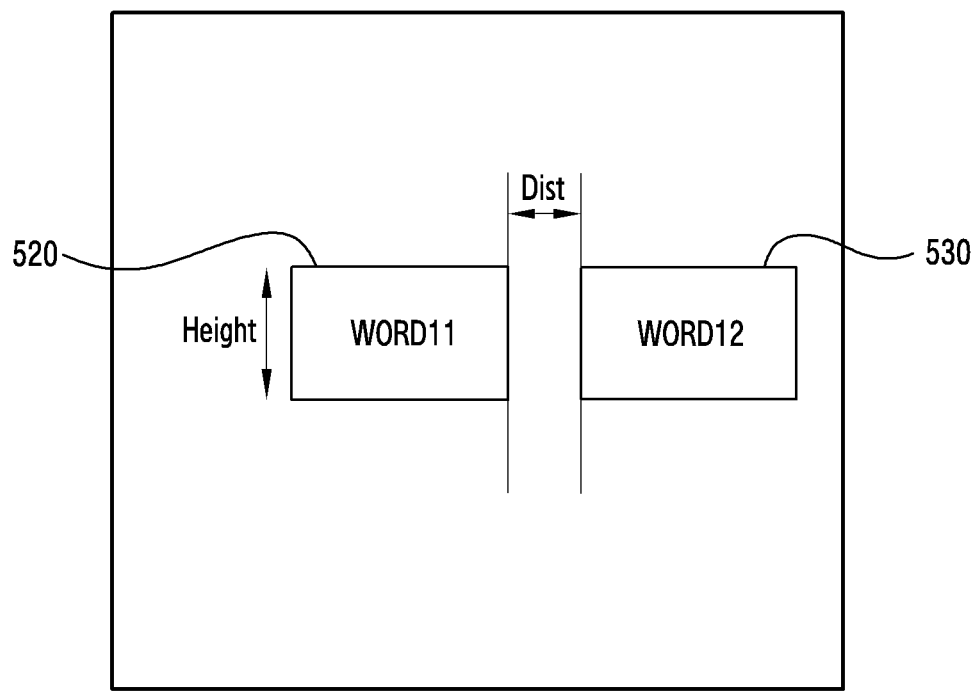

For example, the processor 120 (e.g., the additional information detecting module 124) may recognize at least one of the words 502 through 516 detected from the image as additional information of the object. For example, the processor 120 may rank the words 502 through 516 extracted from the image based on a size (e.g., a vertical length) of the text. As shown in FIG. 5B, the processor 120 may select the words 502 through 508 of a reference number (e.g., four) in order from the first word 502 of the greatest size as the additional information of the object based on the ranking order of the 502 through 516. For example, as shown in FIG. 5C, the processor 120 may delete the words 508, 510, 512, and 516 included in the remove text list among the words 502 through 516 detected in the image. The other words 502, 504, 506, and 514 not removed may be selected as words included in the additional information. The remove text list may include at least one word determined as unnecessary for object identification such as "in advance", "festival", "grand festival", "prepare", "free", "delivery", "free gift", "product", "temporary", "sold out", "sellout" and "present". For example, the processor 120 may rank the words 502 through 516 extracted from the image based on the position of the text as shown in FIG. 5D. The processor 120 may select the words 502, 504, 506 and 508 of the reference number (e.g., four) in order from the second word 504 which is closest from a reference point of the image based on the ranking order of the words 502 through 516 as the additional information of the object. For example, the reference point may include a reference point for measuring a distance of the word, such as center, bottom, top, left or right of the image. For example, if there is a plurality of words (e.g., the second word 504 and the fifth word 510) at the same distance based on the center of the image, the processor 120 may select the word (e.g., the second word) of the relatively greater word size. For example, if the number of languages constituting the word is greater than a reference number (e.g., two), the processor 120 may determine the corresponding word as the word to remove from the additional information. For example, if a length of characters constituting the word is shorter than a reference length, the processor 120 may determine the corresponding word as the word to remove from the additional information. For example, the processor 120 may identify the distance between the words selected as the additional information of the object. As shown in FIG. 5E, if the distance between two words (the eleventh word 520 and the twelfth word 530) is within a reference distance, the processor 120 may synthesize the two words as a single word. The processor 120 may update the priority of the synthesized word relatively high.

For example, the processor 120 may recognize the label detected from the image or the text corresponding to the shape information of the object as the additional information of the object. For example, the processor 120 may identify whether the thesaurus includes other word (e.g., samsung) relating to the word (e.g., 삼성) included in the additional information. The processor 120 may add the other word detected from the thesaurus to the additional information of the object. According to an embodiment, the electronic device may perform operations 403 and 405 at the same time or change the operation order.

The electronic device (e.g., the processor 120) may display the at least one content corresponding to the shape of the object based on the shape information and the additional information of the object, in operation 407. For example, the processor 120 may select a search area (e.g., a storage area) based on at least one of the shape information of the object or the label information included in the image. In the selected search area, the processor 120 may detect at least one content corresponding to the shape information of the object. The processor 120 may rank the at least one content corresponding to the shape information of the object based on the additional information of the object. The processor 120 may control the display 160 to display the at least one content corresponding to the shape information of the object to correspond to the ranked order based on the additional information of the object. For example, the at least one content corresponding to the shape information of the object detected in the search area may include detailed information, as shown in the following Table 2. The processor 120 may identify whether the detailed information of each content includes the word included in the additional information of the object. The processor 120 may set a relatively high priority of the content including the word of the additional information of the object. The processor 120 may rank the at least one content based on the priority of the at least one content corresponding to the shape information of the object.

TABLE 2

<<<mapid>>>7777777
<<<pname>>>stand type fast wireless charger of Samsung electronic ™(EP-NG930B)
<<<price>>>47000
<<<coupo>>>0
<<<dlvcd>>>02
<<<deliv>>>2500
<<<pgurl>>>http://www.samsungmall.co.kr/connect/Gateway.tmall?method=Xsite&prdNo=15633 3717&tid=
<<<igurl>>>http://i.samsungmall.com/t/300/an/3/3/3/7/1/7/1563333717_B.jpg
<<<cate1>>>portable device
<<<cate2>>> portable charger
<<<cate3>>>wireless charger
<<<cate4>>>
<<<caid1>>>1001429
<<<caid2>>>1002726
<<<caid3>>>1009568
<<<caid4>>>
<<<model>>> stand type fast wireless charging EP-NG930B
<<<brand>>>Samsung electronic
<<<maker>>>Samsung
<<<event>>>
<<<pcard>>>**bank12/@@bank12/bc12/woori12/Hana12/K6/N6/Samsung6/
<<<utime>>>2017/04/10 15:57:30
<<<cardn>>>
<<<cardp>>>

According to various embodiments of the present invention, the electronic device may retrieve at least one content corresponding to the shape of the object through an external device (e.g., the server 106). For example, the processor 120 may select the external device based on at least one of the shape information of the object or the label information included in the image. The processor 120 may control the communication interface 170 to transmit a search request signal corresponding to the shape information of the object to the external device. The processor 120 may receive at least one content corresponding to the shape information of the object as a response corresponding to the search request signal from the external device. For example, the external device may include a particular storage area (data base) included in the external device.

According to an embodiment, the area for detecting the shape information of the object and the area for detecting the additional information in the image may be the same or different.

Figure 6:
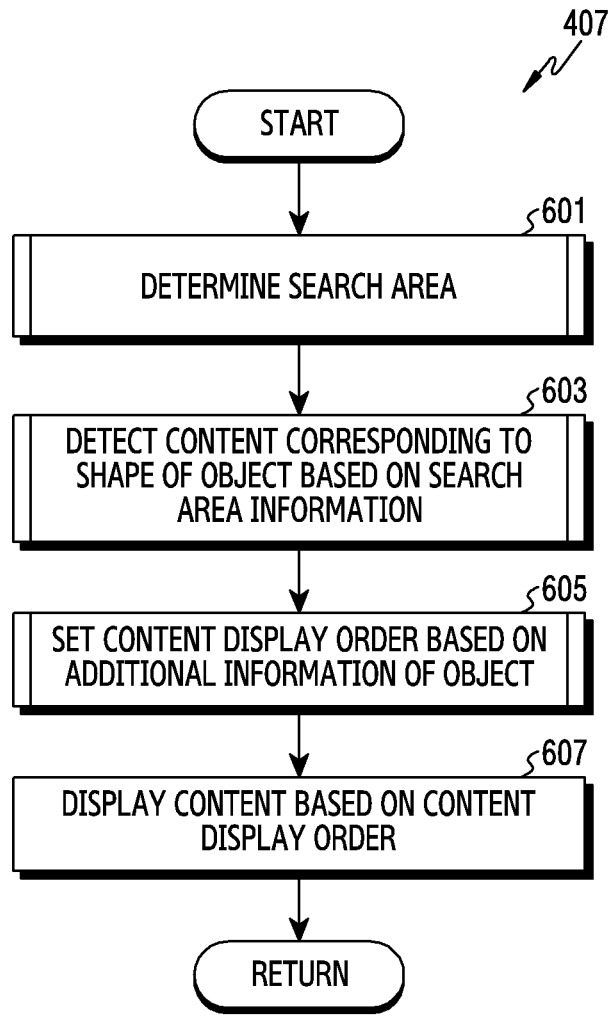
FIG. 6 illustrates a flowchart for setting a display order of a content corresponding to an object in an electronic device according to various embodiments of the present invention.
Figure 7A:
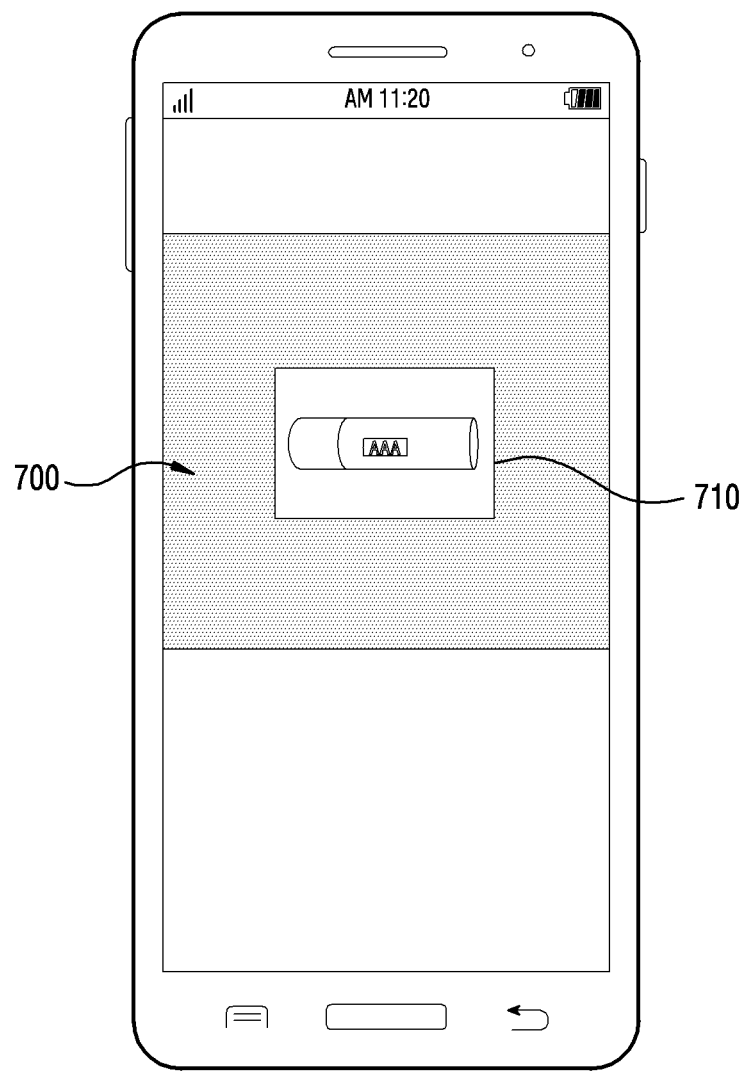
FIG. 7A through FIG. 7B illustrate an example of a screen configuration for displaying a content corresponding to an object in an electronic device according to various embodiments of the present invention.
Figure 7B:
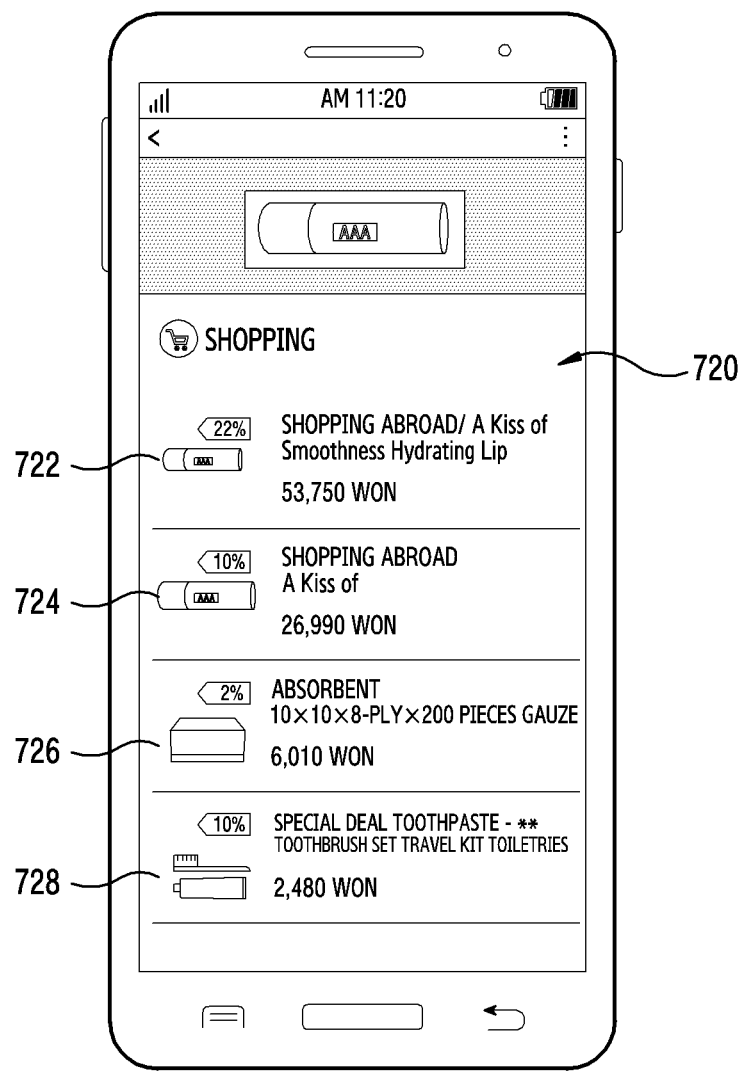
Figure 8A:
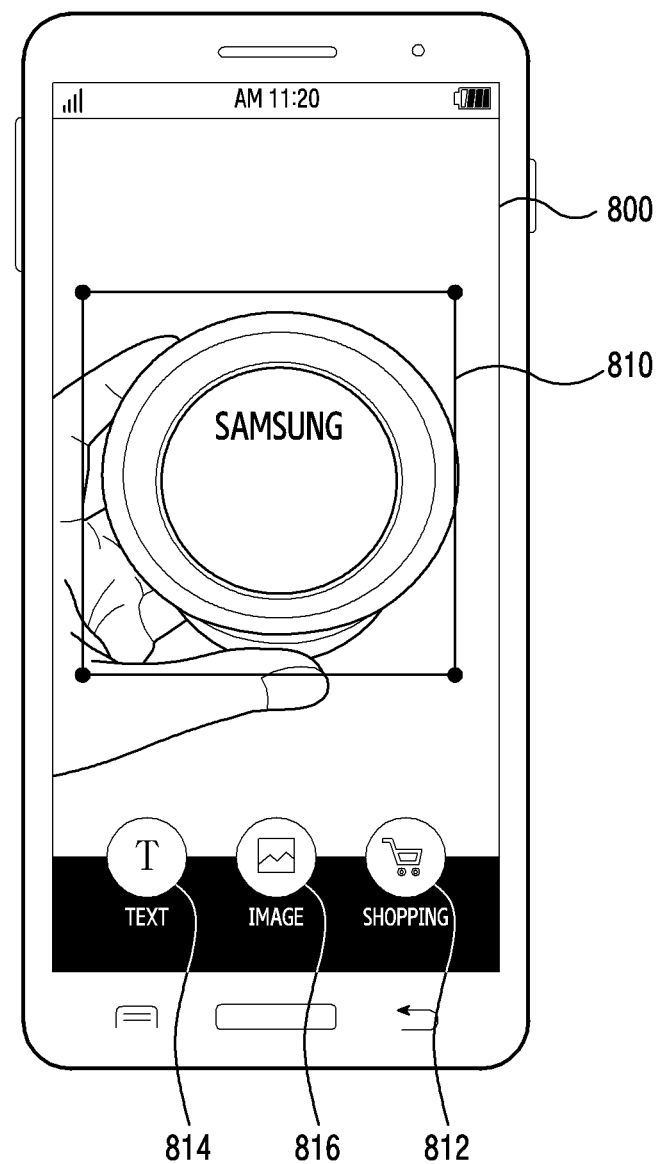
FIG. 8A through FIG. 8B illustrate another example of a screen configuration for displaying a content corresponding to an object in an electronic device according to various embodiments of the present invention.
Figure 8B:
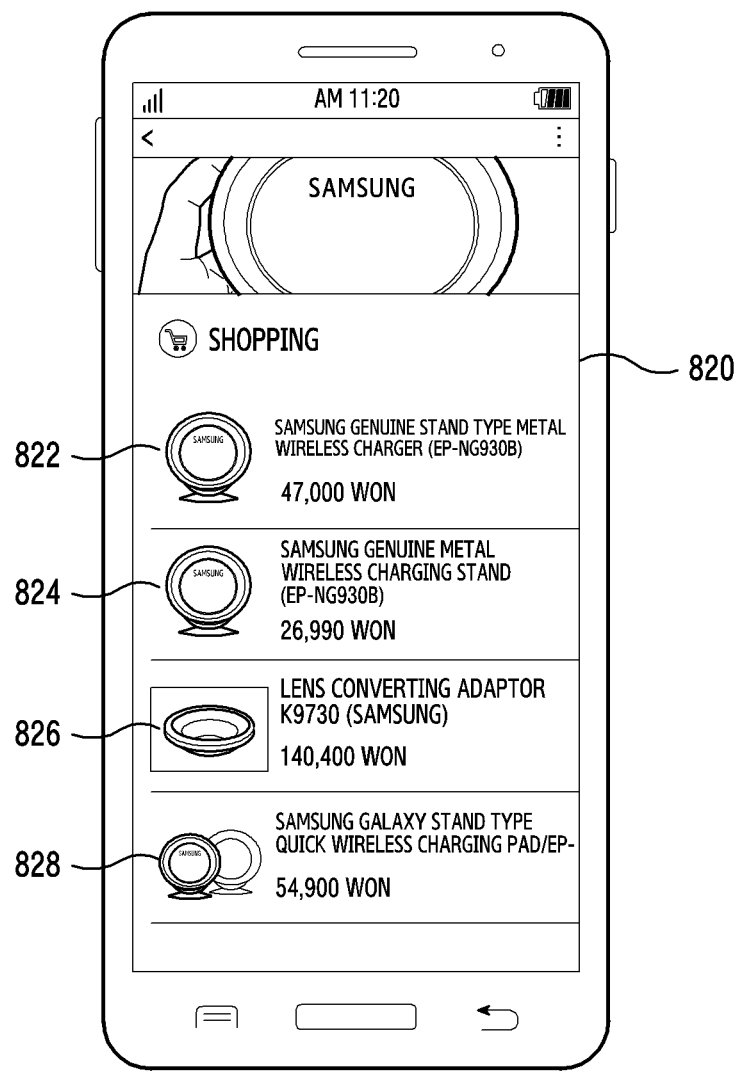

FIG. 6 illustrates a flowchart for setting a display order of a content corresponding to an object in an electronic device according to various embodiments of the present invention. FIG. 7A through FIG. 7B illustrate an example of a screen configuration for displaying a content corresponding to an object in an electronic device according to various embodiments of the present invention. FIG. 8A through FIG. 8B illustrate another example of a screen configuration for displaying a content corresponding to an object in an electronic device according to various embodiments of the present invention. The following descriptions explain operation for displaying the content, in operation 407 of FIG. 7. In the following descriptions, the electronic device may include the electronic device 101 of FIG. 1A or at least part (e.g., the processor 120) of the electronic device 101.

Referring to FIG. 6, the electronic device (e.g., the content search module 123) may, if detecting shape information and additional information of the object in the image (e.g., operation 403 and operation 405 of FIG. 4), determine a search area to use for the search service based on at least one of the shape information of the object or label information of the object, in operation 601. For example, the processor 120 (e.g., the object detecting module 120) may detect an object 710 in an image 700 displayed on the display 160, as shown in FIG. 7A. The processor 120 (e.g., the content search module 123) may select a server to use for the search service based on at least one of shape information of the object 710 or a label (e.g., "AAA") in the object 710. For example, the processor 120 (e.g., the object detecting module 120) may detect an object 810 in an image 800 acquired by the camera 180, as shown in FIG. 8A. If recognizing the object 810, the processor 120 may control the display 160 to display a search menu (e.g., a shopping 812, a text 814 and an image 816). If receiving a selection input corresponding to the search menu of the shopping 812 or the image 816, the processor 120 (e.g., the content search module 123) may select the server to use for the search service based on at least one of the shape information of the object 710 or the label (e.g., "AAA") in the object 710. For example, the search menu of the text 814 may include a menu for extracting a text from the image or providing a translation service.

The electronic device (e.g., the content search module 123) may detect at least one content corresponding to the shape of the object based on search area information, in operation 603. For example, the processor 120 (e.g., the content search module 123) may control the communication interface 170 to transmit a search request signal to an external device (a server) selected based on at least one of the shape information of the object or the label information of the object. The processor 120 (e.g., the content search module 123) may receive at least one content corresponding to the shape information of the object in response to the search request signal, via the communication interface 170. For example, the search request signal may include the shape information of the object to be retrieved.

The electronic device (e.g., the ranking module 125) may set a display order of the at least one content corresponding to the shape of the object based on the additional information of the object, in operation 605. For example, the at least one content corresponding to the shape of the object may include a priority corresponding to similarity with the shape of the object. The processor 120 (e.g., the ranking module 125) may identify whether detailed information of each content includes a word corresponding to the additional information of the object. The processor 120 (e.g., the ranking module 125) may update the priority of the content including the word corresponding to the additional information of the object relatively higher than other content. The processor 120 (e.g., the ranking module 125) may set the display order of the content to correspond to the updated priority of at least one content. For example, the additional information of the object may be set based on at least one of a text detected from the image, a text corresponding to the label or a text corresponding to the shape information of the object.

The electronic device (e.g., the processor 120) may display the at least one content corresponding to the shape information of the object on the display based on the display order of the content, in operation 607. For example, the processor 120 may control the display 160 to display at least one content 722 through 728 corresponding to the shape of the object 710 based on the shape information of the object 710 in the image 700 and the display order corresponding to the additional information, as shown in FIG. 7B. The display 160 may display the at least one content 722 through 728 corresponding to the shape of the object 710 in at least a partial area 720 separated from the object 710. For example, the processor 120 may control the display 160 to display at least one content 822 through 828 corresponding to a shape of an object 810 in at least a partial area 820 of the display 160 based on shape information of the object 810 in an image 800 and the display order corresponding to the additional information, as shown in FIG. 8B.

Figure 9:
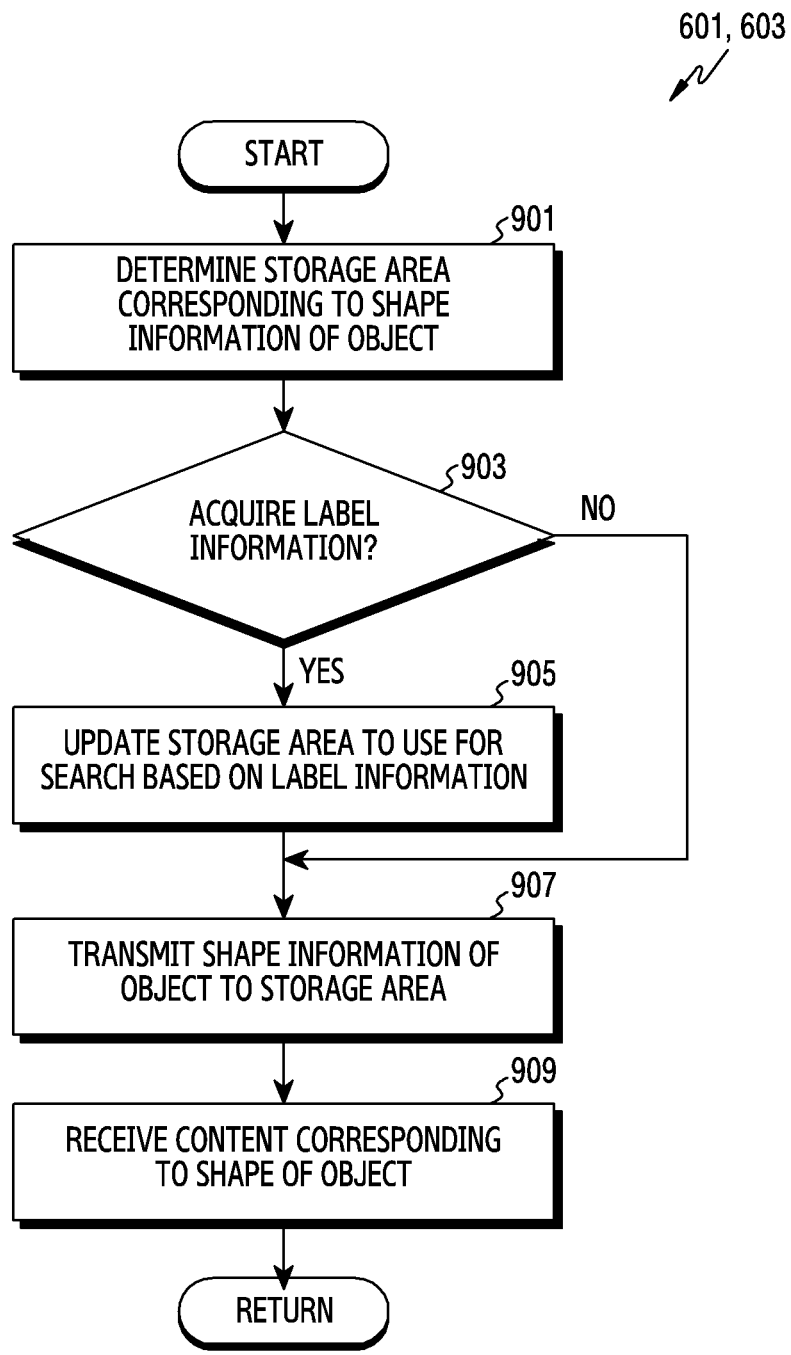
FIG. 9 illustrates an example of a flowchart for setting a search area based on shape information and label information of an object in an electronic device according to various embodiments of the present invention.

FIG. 9 illustrates an example of a flowchart for setting a search area based on shape information and label information of an object in an electronic device according to various embodiments of the present invention. The following descriptions explain operation for setting the search area of the content corresponding to the shape of the object in operation 601 through operation 603 of FIG. 6. In the following descriptions, the electronic device may include the electronic device 101 of FIG. 1A or at least part (e.g., the processor 120) of the electronic device 101.

Referring to FIG. 9, if detecting of shape information and additional information of the object in the image for providing the search service (e.g., operation 403 and operation 405 of FIG. 4), the electronic device (e.g., the content search module 123) may determine a storage area corresponding to the shape information of the object, in operation 901. For example, the electronic device 101 may use a plurality of storage areas for the search service. The processor 120 (e.g., the content search module 123) may select the at least one storage area corresponding to a shape (e.g., top, bottom) or a purpose of the object among the plurality of the storage areas. For example, the storage area may include an external device or a storage space (data base) included in the external device. The purpose of the object may include a use field of the object which is determined based on the shape information of the object.

The electronic device (e.g., the label detecting module 121) may identify whether label information is detected from the image acquired by the camera in operation 903. For example, the processor 120 (e.g., the label detecting module 121) may identify whether at least one object detected from the image includes an object corresponding to a reference label. For example, the label may include at least one of a logo, a brand, a text, or a corporate identity (CI).

If not detecting the label information in the image acquired by the camera, the electronic device may determine the storage area corresponding to the shape information of the object as the storage area to use for providing the search service.

If detecting the label information in the image acquired by the camera, the electronic device (e.g., the content search module 123) may update the storage area to use for providing the search service based on the label information, in operation 905. For example, the processor 120 (e.g., the content search module 123) may further select the storage area corresponding to the label information from the at least one storage area corresponding to the shape information of the object. For example, the processor 120 (e.g., the content search module 123) may set a search range based on the label information within the at least one storage area corresponding to the shape information of the object.

The electronic device (e.g., the content search module 123) may transmit a search request signal to the storage area to use for providing the search service, in operation 907. For example, the search request signal may include the shape information (e.g., an exterior shape) of the object to search.

The electronic device (e.g., the content search module 123) may receive at least one content corresponding to the shape information of the object in response to the search request signal, in operation 909. For example, the processor 120 (e.g., the content search module 123) may identify product identification information (PID) corresponding to the shape information of the object in the response signal of the search request signal, via the communication interface 170. The processor 120 (e.g., the content search module 123) may obtain detailed information corresponding to the product identification information from a product server. For example, the product identification information corresponding to the shape information of the object may include identification information corresponding to a product image of which similarity with the shape information of the object exceeds a reference similarity.

Figure 10:
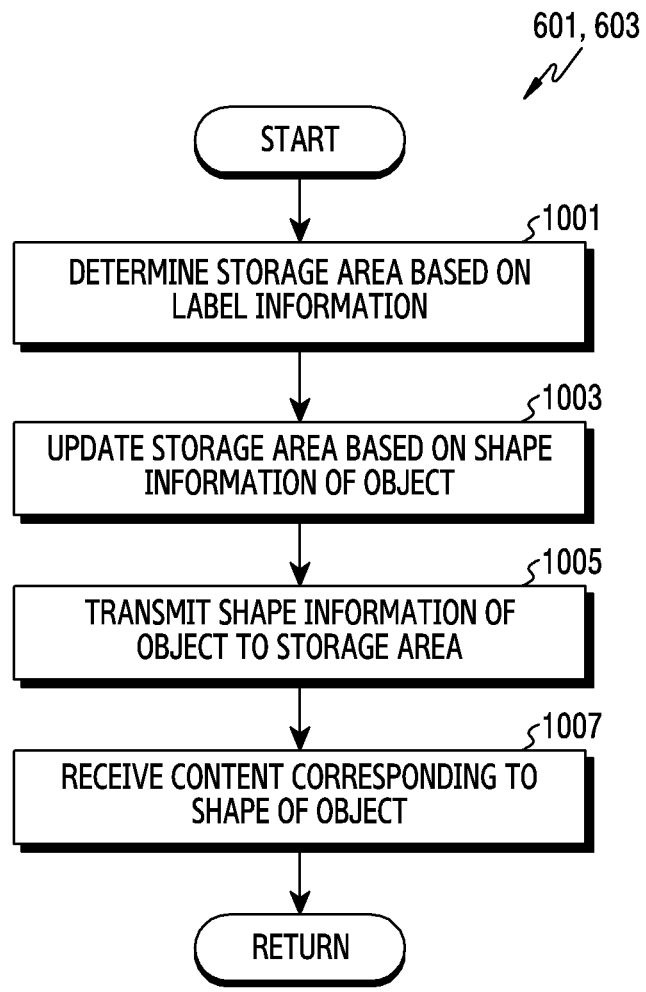
FIG. 10 illustrates another example of a flowchart for setting a search area based on shape information and label information of an object in an electronic device according to various embodiments of the present invention.

FIG. 10 illustrates another example of a flowchart for setting a search area based on shape information and label information of an object in an electronic device according to various embodiments of the present invention. The following descriptions explain operation for setting the search area of the content corresponding to the shape of the object in operation 601 through operation 603 of FIG. 6. In the following descriptions, the electronic device may include the electronic device 101 of FIG. 1A or at least part (e.g., the processor 120) of the electronic device 101.

Referring to FIG. 10, if detecting shape information and additional information of the object in the image for providing the search service (e.g., operation 403 and operation 405 of FIG. 4), the electronic device (e.g., the content search module 123) may determine a storage area corresponding to label information detected from the image, in operation 1001. For example, if detecting a label of "Samsung" in an image acquired through the camera 180, the processor 120 may determine that the object included in the image is included in a category of an electronic product. The processor 120 may select an external device corresponding to the category of the electronic product or a storage area of the external device.

The electronic device (e.g., the content search module 123) may update the storage area to use for providing the search service based on the shape information of the object, in operation 1003. For example, the processor 120 (e.g., the content search module 123) may limit a search range in the storage area corresponding to the category of the electronic product based on the shape information of the object.

The electronic device (e.g., the content search module 123) may transmit a search request signal to the storage area to use for providing the search service, in operation 1005. For example, the search request signal may include the shape information (e.g., an exterior shape) of the object to retrieve.

The electronic device (e.g., the content search module 123) may receive at least one content corresponding to the shape information of the object from the storage area to use for providing the search service, in operation 1007. For example, the processor 120 (e.g., the content search module 123) may receive identification information and detailed information of at least one product image of which similarity with the shape information of the object exceeds a reference similarity from the external device to use for providing the search service.

Figure 11:
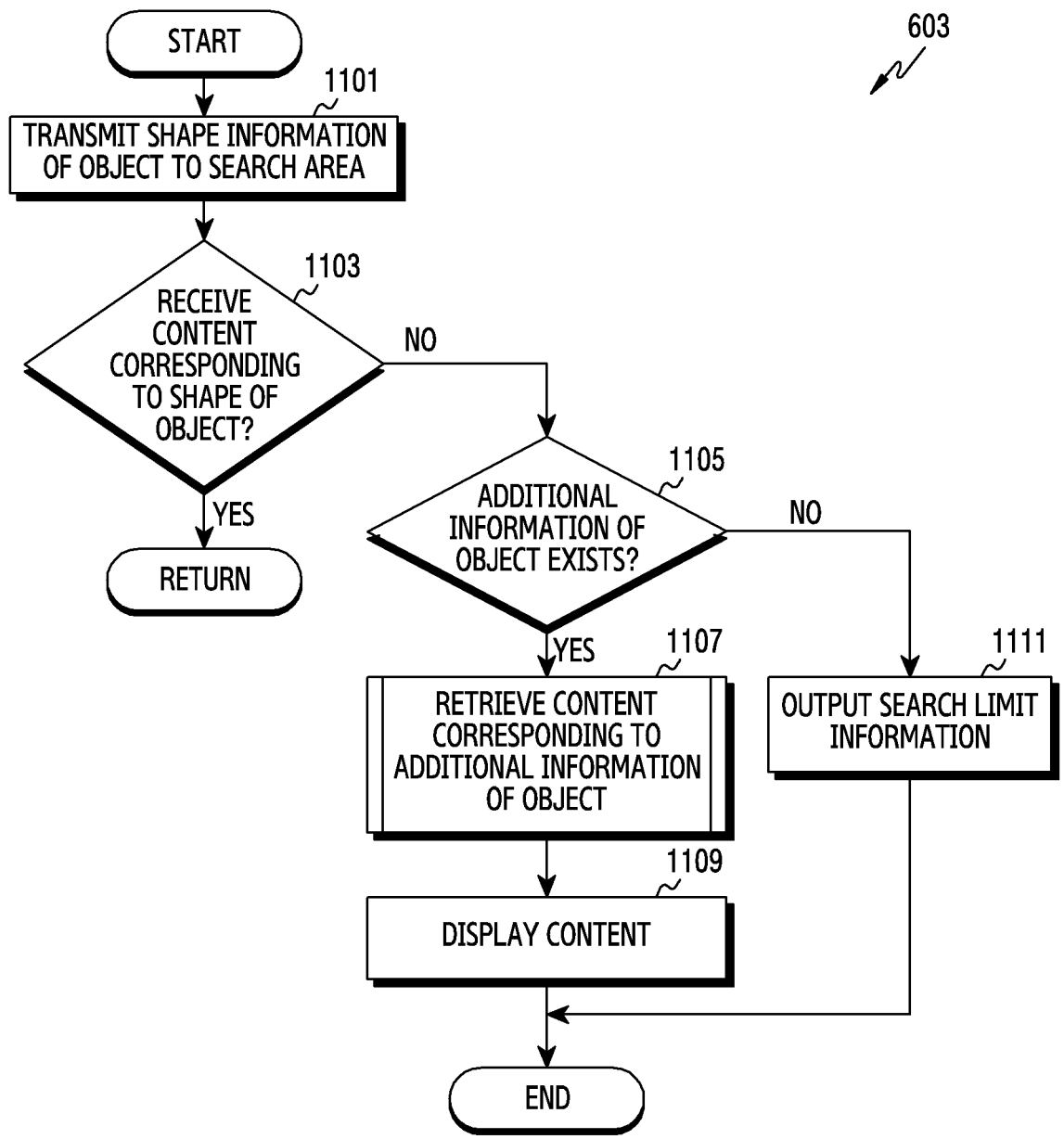
FIG. 11 illustrates a flowchart for retrieving a content corresponding to an object based on additional information of the object in an electronic device according to various embodiments of the present invention.

FIG. 11 illustrates a flowchart for retrieving a content corresponding to an object based on additional information of the object in an electronic device according to various embodiments of the present invention. The following descriptions explain operation for detecting the content corresponding to the shape of the object in operation 603 of FIG. 6. In the following descriptions, the electronic device may include the electronic device 101 of FIG. 1A or at least part (e.g., the processor 120) of the electronic device 101.

Referring to FIG. 11, if determining a search area to use for providing a search service (e.g., operation 601 of FIG. 6), the electronic device (e.g., the content search module 123) may transmit shape information of the object to the search area, in operation 1101. For example, the processor 120 (e.g., the content search module 123) may determine at least one storage area to use for providing the search service based on at least one of shape information or label information detected from the image displayed on the display 160. The processor 120 (e.g., the content search module 123) may control the communication interface 170 to transmit a search request signal to each storage area. For example, the search request signal may include information of an exterior shape of the object to retrieve. In another embodiment, the search request signal may include the label information of the object to retrieve.

The electronic device (e.g., the content search module 123) may identify whether a content corresponding to the shape of the object is received, in operation 1103. For example, the processor 120 (e.g., the content search module 123) may identify whether a response signal corresponding to the search request signal is received, via the communication interface 170. The response signal may include at least one product identification information corresponding to the shape information of the object. For example, if not receiving the response signal over a reference time from the search request signal transmission time, the processor 120 (e.g., the content search module 123) may control the communication interface 170 to retransmit the search request signal. If the number of the search request signal transmissions exceeds a reference number of times, the processor 120 (e.g., the content search module 123) may determine that there is no content corresponding to the shape information of the object.

According to an embodiment, if receiving at least one content corresponding to the shape of the object, the electronic device (e.g., the ranking module 125) may set a display order of the at least content based on additional information of the object (e.g., operation 605 of FIG. 6).

If not receiving the content corresponding to the shape of the object, the electronic device (e.g., the additional information detecting module 124) may identify whether there is additional information of the object, in operation 1105. For example, the processor 120 may identify whether there is a keyword corresponding to the object detected from the image acquired through the camera 180. The keyword may be set based on at least one of a text detected from the image, a text corresponding to the label or a text corresponding to the shape information of the object.

If there is the additional information of the object, the electronic device (e.g., the content search module 123) may retrieve at least one content corresponding to the additional information of the object, in operation 1107. For example, the processor 120 (e.g., the content search module 123) may select a representative keyword based on a priority of the additional information of the object. The processor 120 (e.g., the content search module 123) may retrieve at least one content corresponding to the representative keyword. For example, the priority of the additional information may be set based on at least one of a size, a position, or a word combination type of the text.

The electronic device (e.g., the processor 120) may display at least one content corresponding to the additional information of the object on the display, in operation 1109. For example, the processor 120 may differently set at least one of an area for displaying the content or a graphic variable so as to distinguish the content corresponding to the additional information of the object and the content corresponding to the shape information of the object. The graphic variable may include at least one of a color, a background color, a shadow of the content, or a size of the content.

If there is no additional information of the object, the electronic device (e.g., the processor 120) may output search limit information informing that the search of the content corresponding to the object is limited, in operation 1111. For example, the search limit information may include at least one of search area error information or content search error information. For example, the search limit information may be outputted in at least one form of graphics, sound, or vibration.

Figure 12:
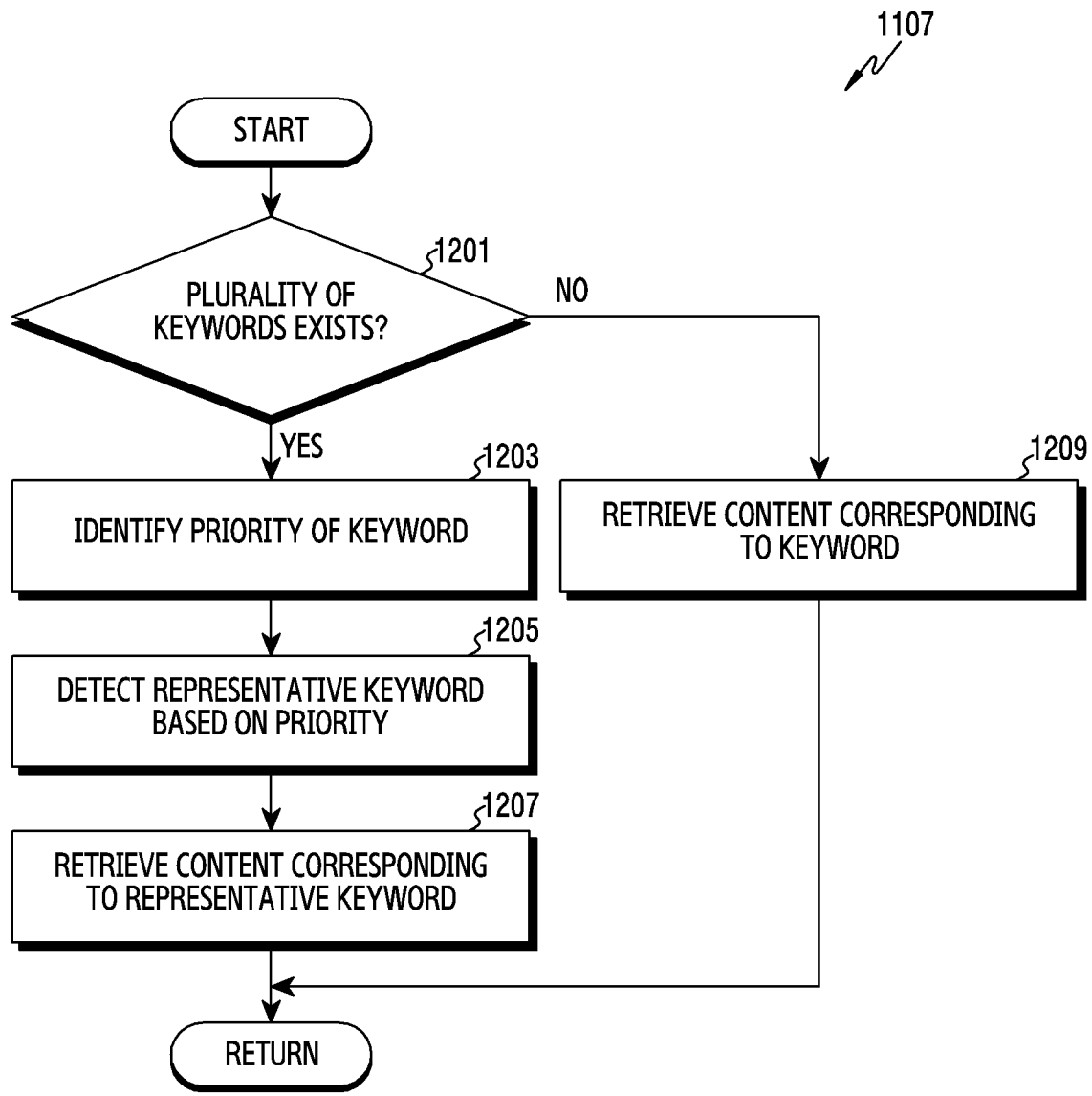
FIG. 12 illustrates a flowchart for determining additional information of an object in an electronic device according to various embodiments of the present invention.

FIG. 12 illustrates a flowchart for determining additional information of an object in an electronic device according to various embodiments of the present invention. The following descriptions explain operation for retrieving the content corresponding to the additional information of the object in operation 1107 of FIG. 11. In the following descriptions, the electronic device may include the electronic device 101 of FIG. 1A or at least part (e.g., the processor 120) of the electronic device 101.

Referring to FIG. 12, if detecting additional information of an object in an image acquired through the camera (e.g., operation 1105 of FIG. 11), the electronic device (e.g., the additional information detecting module 124) may identify whether a plurality of keywords is included in the additional information of the object, in operation 1201.

If detecting a plurality of keywords corresponding to the object in the image, the electronic device (e.g., the additional information detecting module 124) may identify a priority of the keywords corresponding to the object, in operation 1203. For example, the priority of the keyword may be set based on at least one of a word size in the keyword, a word position, a text corresponding to a label, a text corresponding to a shape of the object or a word combination type. For example, the word combination type may include a word combination scheme which constitutes one keyword. If synthesizing two words to one keyword based on a distance between the two words, the processor 120 may set the priority of the corresponding keyword relatively high. For example, the position of the word is a word position corresponding to the shape of the object and may differently set the priority corresponding to the position of the word based on the shape of the object.

The electronic device (e.g., the additional information detecting module 124) may detect a representative keyword based on priority of the keyword corresponding to the object, in operation 1205. For example, the representative keyword may include keywords of a reference number in a descending order of the priority.

The electronic device (e.g., the content search module 123) may retrieve at least one content corresponding to the representative keyword, in operation 1207. For example, the processor 120 (e.g., the content search module 123) may control the communication interface 170 to transmit a search request signal including the representative keyword to a product server. The processor 120 (e.g., the content search module 123) may receive at least one content corresponding to the representative keyword from the product server. The content corresponding to the representative keyword may include at least one product including at least part of the representative keyword in detailed information.

If detecting one keyword corresponding to the object in the image, the electronic device (e.g., the content search module 123) may retrieve at least one content corresponding to the corresponding keyword, in operation 1209. For example, the processor 120 (e.g., the content search module 123) may control the communication interface 170 to transmit a search request signal corresponding to the keyword detected in the image to the product server. The processor 120 may receive at least one product information corresponding to the representative keyword from the product server.

Figure 13:
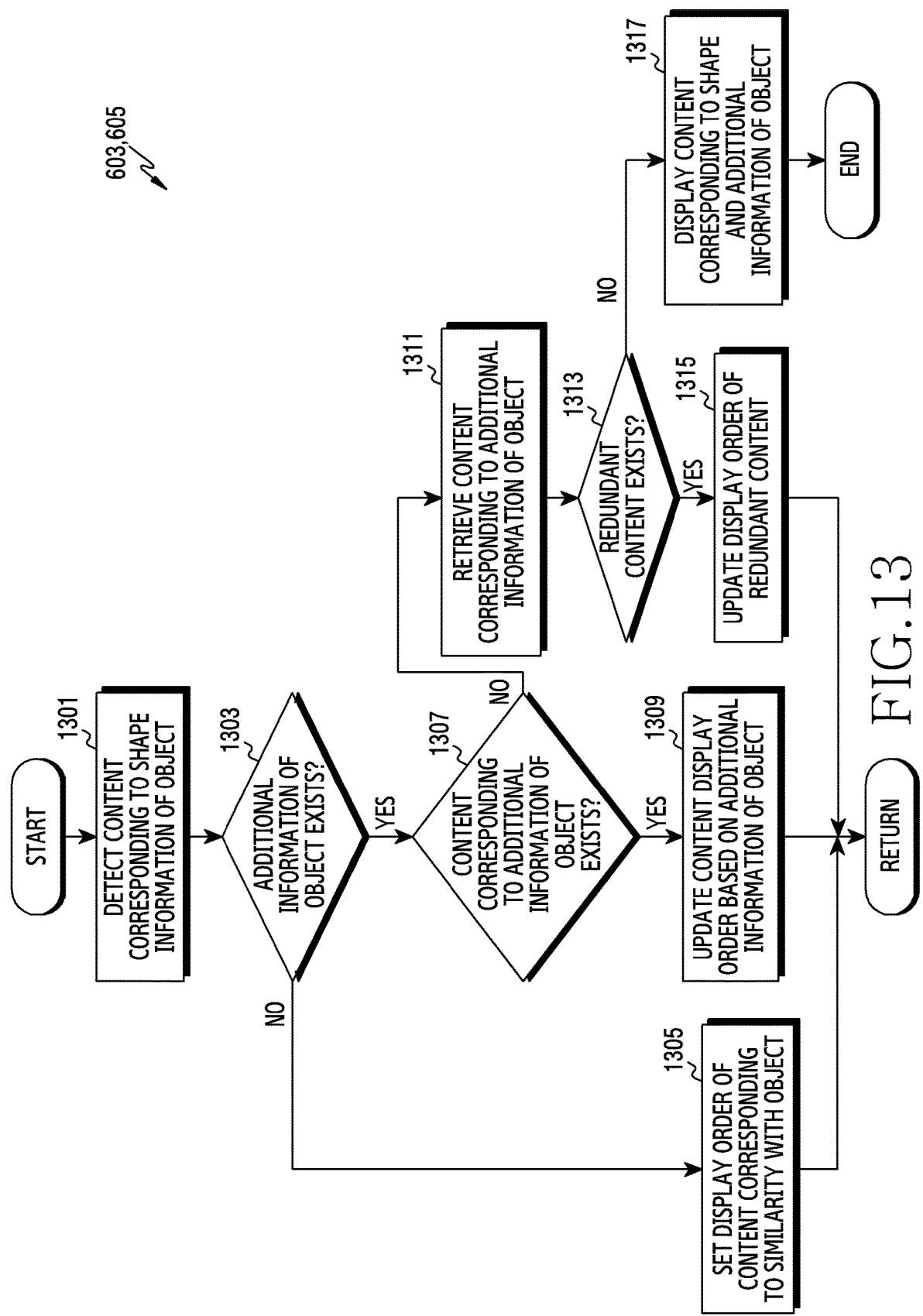
FIG. 13 illustrates a flowchart for ranking a content corresponding to an object based on additional information of the object in an electronic device according to various embodiments of the present invention.
Figure 14:
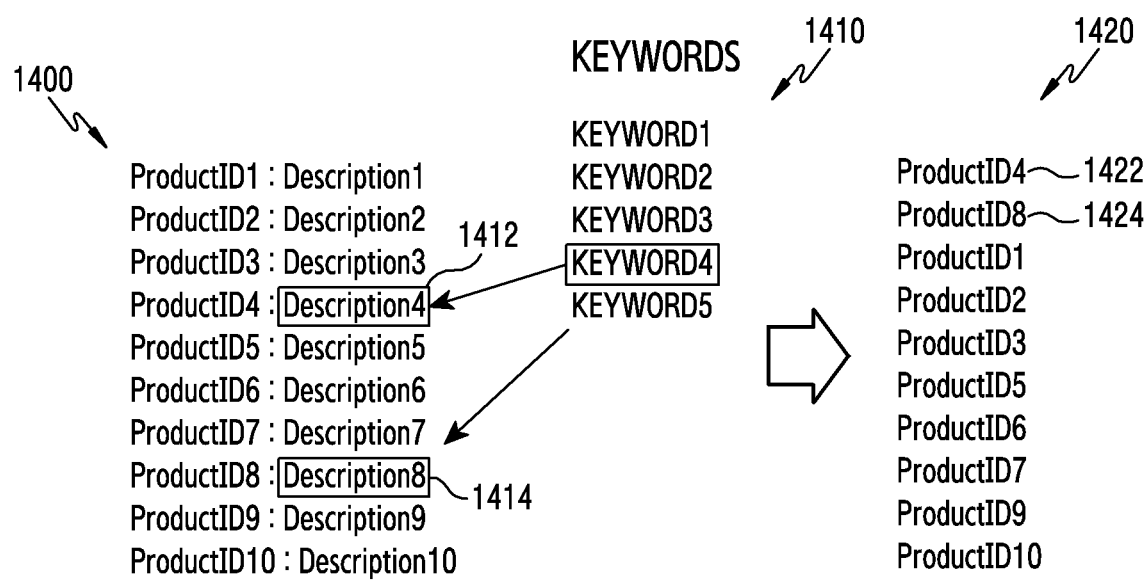
FIG. 14 illustrates a configuration for ranking a content corresponding to an object based on additional information of the object in an electronic device according to various embodiments of the present invention.
Figure 15A:
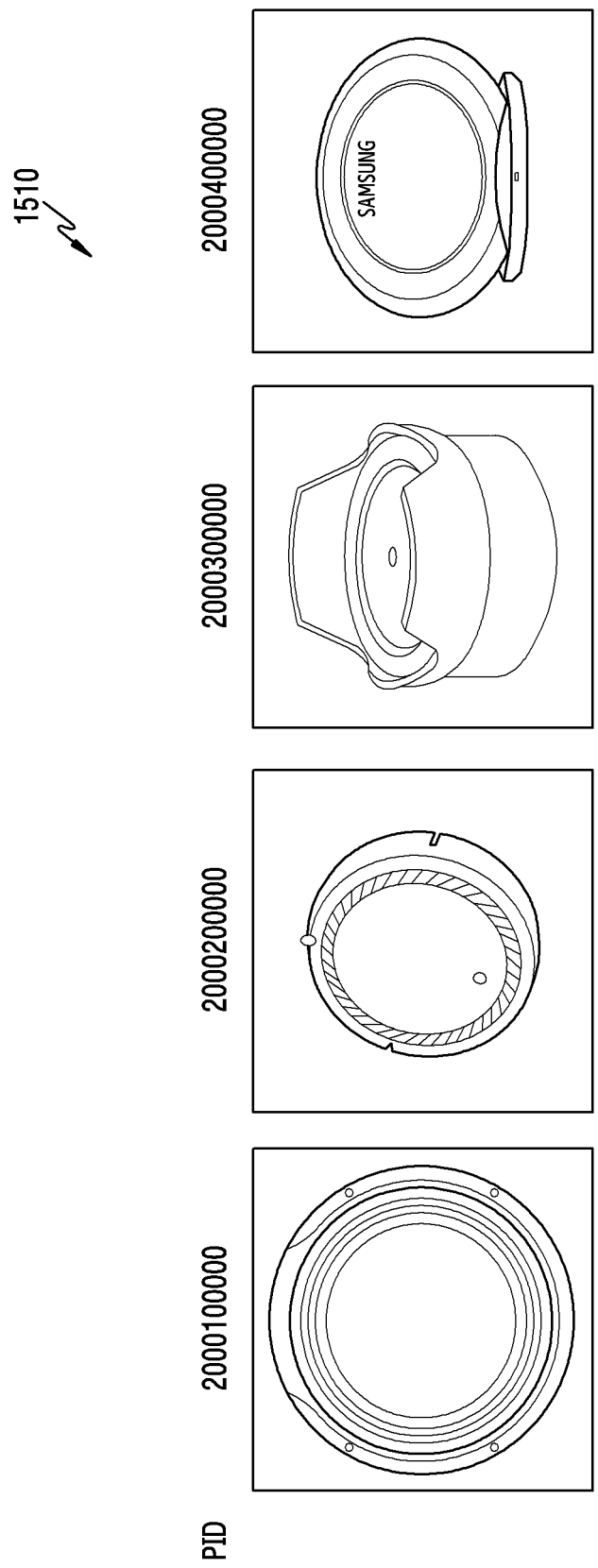
FIG. 15A through FIG. 15B illustrate a ranking order of a content corresponding to an object in an electronic device according to various embodiments of the present invention.
Figure 15B:
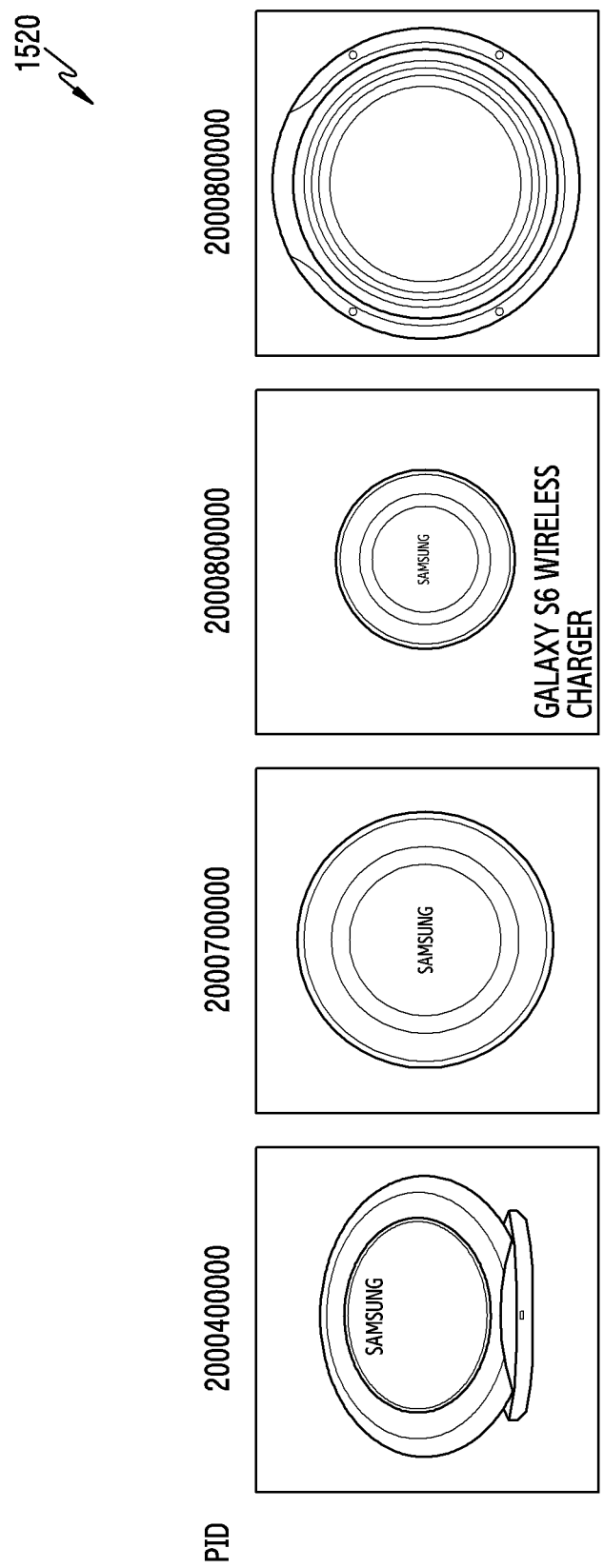

FIG. 13 illustrates a flowchart for ranking a content corresponding to an object based on additional information of the object in an electronic device according to various embodiments of the present invention. FIG. 14 illustrates a configuration for ranking a content corresponding to an object based on additional information of the object in an electronic device according to various embodiments of the present invention. FIG. 15A through FIG. 15B illustrate a ranking order of a content corresponding to an object in an electronic device according to various embodiments of the present invention. The following descriptions explain operation for ranking the content based on the additional information of the object in operation 603 through operation 605 of FIG. 6. In the following descriptions, the electronic device may include the electronic device 101 of FIG. 1A or at least part (e.g., the processor 120) of the electronic device 101.

Referring to FIG. 13, if determining a search area to use for a search service (e.g., operation 601 of FIG. 6), the electronic device (e.g., the content search module 123) may detect at least one content corresponding to shape information of an object through the search area, in operation 1301. For example, the processor 120 (e.g., the content search module 123) may determine a server (or a storage area of the server) to use for the search service based on at least one of the shape information or label information of the object. The processor 120 (e.g., the content search module 123) may obtain identification information of at least one product corresponding to the shape information of the object, via the server to use for the search service. The processor 120 (e.g., the content search module 123) may obtain detailed information 1400 corresponding to each product identification information from a product server, as shown in FIG. 14.

The electronic device (e.g., the additional information detecting module 124) may identify whether there is additional information of the object detected from the image, in operation 1303. For example, the processor 120 (e.g., the additional information detecting module 124) may identify whether there is at least one keyword detected in the image for providing the search service.

If there is no additional information of the object detected in the image, the electronic device (e.g., the ranking module 125) may set a display order of the content based on similarity with the shape information of the object, in operation 1305. For example, at least one content corresponding to the shape information of the object may include a priority corresponding to the similarity of the shape information of the object with a reference image (e.g., a product image). The processor 120 (e.g., the ranking module 125) may set a display order 1510 of at least one content in a descending order of the similarity with the shape of the object based on the priority of at least one content corresponding to the shape information of the object, as shown in FIG. 15A.

If there is additional information of the object detected from the image, the electronic device (e.g., the ranking module 125) may identify whether there is a content corresponding to the additional information of the object among at least one content corresponding to the shape information of the object, in operation 1307. For example, the processor 120 (e.g., the ranking module 125) may detect at least one keyword 1410 corresponding to the object detected from the image, as shown in FIG. 14. The processor 120 (e.g., the ranking module 125) may identify whether there is a product including at least one keyword 1410 in the detailed information 1400 of the at least one product corresponding to the shape information of the object.

If there is the content corresponding to the additional information of the object, the electronic device (e.g., the ranking module 125) may update the display order of the content based on the additional information of the object, in operation 1309. For example, the processor 120 (e.g., the ranking module 125) may update the priority of the at least one content corresponding to the shape information of the object based on the additional information of the object. For example, the processor 120 (e.g., the ranking module 125) may update the priority of the content including at least one keyword corresponding to the object relatively high. The processor 120 (e.g., the ranking module 125) may set a display order 1520 of at least one content to correspond to the updated priority of the content based on the additional information of the object, as shown in FIG. 15B. For example, if there is a plurality of contents including the additional information of the object, the processor 120 (e.g., the ranking module 125) may update the display order of the content based on the similarity with the shape information of the object. For example, the processor 120 (e.g., the ranking module 125) may detect at least one keyword corresponding to the object in detailed information (description) of a PID 4 product 1412 and a PDI 8 product 1414, as shown in FIG. 14. If the PID 4 product 1412 is higher than the PDI 8 product 1414 in the similarity of the product image and form information of the object, the processor 120 (e.g., the ranking module 125) may set the display order of the PID 4 product 1412 to a first rank 1422 and update the display order of the PDI 8 product 1414 to a second rank 1424 (1420).

If there is no content corresponding to the additional information of the object, the electronic device (e.g., the content search module 123) may retrieve at least one content corresponding to the additional information of the object, in operation 1311. For example, the processor 120 (e.g., the content search module 123) may select a representative keyword from at least one keyword corresponding to the object, as shown in operation 1201 through operation 1209 of FIG. 12. The processor 120 (e.g., the content search module 123) may detect at least one content corresponding to the representative keyword via a product server.

In operation 1313, the electronic device (e.g., the ranking module 125) may identify whether there is a redundant content in at least one content corresponding to the shape information of the object and at least one content corresponding to the additional information of the object. For example, the processor 120 (e.g., the ranking module 125) may identify whether there is a product having the same identification information in at least one product corresponding to the shape information of the object and at least one product corresponding to the additional information of the object.

If there is at least one redundant content, the electronic device (e.g., the ranking module 125) may update the display order of the content to display the redundant content first, in operation 1315. For example, if there is at least one redundant content, the processor 120 (e.g., the ranking module 125) may differently set at least one of an area for displaying the content or a graphic variable so as to distinguish the content corresponding to the additional information of the object, the content corresponding to the shape information of the object and the redundant content. For example, if there is a redundant content, the processor 120 (e.g., the ranking module 125) may control the display 160 to display the at least one content corresponding to the shape information of the object based on the updated display order. The content corresponding to the additional information of the object may be displayed in at least a partial area of the display 160 to distinguish at least one other content than the redundant content from the content corresponding to the shape information of the object.

If there is no redundant content, the electronic device (e.g., the processor 120) may display the at least one least content corresponding to the additional information of the object and the at least one content corresponding to the shape information of the object on the display, in operation 1317. For example, the processor 120 may control the display 160 to display the content corresponding to the additional information of the object and the content corresponding to the shape information of the object in different areas of the display 160.

According to various embodiments of the present invention, an operating method of an electronic device may include acquiring an image including an object through a camera electrically coupled with the electronic device, identifying first information relating to a shape of the object through a first area corresponding to the object in the image, identifying second information relating to additional information of the object through a second area in the image, obtaining at least one content corresponding to the first information from an external device, and displaying at least one content corresponding to the first information, based at least on the first information and the second information.

According to various embodiments, the external device may include a plurality of storage areas, and obtaining the content may include obtaining at least one content corresponding to the first information from at least one storage area corresponding to at least one of shape information or label information of the object among the plurality of the storage areas.

According to various embodiments, obtaining the content may include obtaining at least one product identification information corresponding to the first information from the external device, and obtaining detailed information corresponding to the at least one product identification information from other external device as at least part of the at least one content.

According to various embodiments, identifying the second information may include detecting the second information based one at least one of a text extracted from the image, a text corresponding to a label extracted from the image or a text corresponding to a shape of the object.

According to various embodiments, identifying the second information may include setting at least part of the text extracted from the image as the second information based on at least one of a size of a word extracted from the image, a display position of the word, the number of characters constituting the word, the number of languages included in the word, a remove word list or a distance between words.

According to various embodiments, displaying the content may include displaying the at least one content on a display electrically coupled with the electronic device, based on a level at which the at least one content is associated with the first information and the second information.

According to various embodiments, displaying the content may include setting a priority of the at least one content based on similarity of the at least one content and the first information, updating a priority of the content corresponding to the second information among the at least one content, and displaying the at least one content on the display based on the updated priority.

According to various embodiments, the method may further include identifying whether there is the content corresponding to the second information in at least one content corresponding to the first information, if there is no content corresponding to the second information, obtaining at least one other content corresponding to at least part of the second information from other external device, and displaying the at least one content corresponding to the first information and the at least one other content.

According to various embodiments, displaying the content may include displaying at least one content corresponding to the first information in a first area of a display functionally coupled with the electronic device, and display the at least one other content in a second area of the display.

According to various embodiments, displaying the content may include detecting a redundant content in the at least one content corresponding to the first information and the at least one other content, updating a priority of the redundant content among the at least one content corresponding to the first information, and displaying the at least one content corresponding to the first information on the display based on the updated priority.

According to various embodiments of the present invention, an operating method of an electronic device (e.g., a server device) may include receiving an image from an external device, identifying first information relating to a shape of the object through a first area corresponding to the object in the image, identifying second information relating to additional information of the object through a second area in the image, obtaining at least one content corresponding to the first information, ranking at least one content corresponding to the first information among the plurality of the contents, based at least on the first information and the second information, and transmit the ranked at least one content corresponding to the first information to the external device.

According to various embodiments, obtaining the content may include obtaining at least one content corresponding to the first information from at least one storage area corresponding to at least one of shape information or label information of the object among the plurality of the storage areas.

According to various embodiments, ranking the content may include setting a priority of the at least one content based on similarity of the at least one content and the first information, updating a priority of a content corresponding to the second information among the at least one content, and ranking the at least one content based on the updated priority.

According to various embodiments, ranking the content may include identifying whether there is the content corresponding to the second information in at least one content corresponding to the first information, if there is no content corresponding to the second information, obtaining at least one other content corresponding to at least part of the second information from other external device, detecting a redundant content in the at least one content corresponding to the first information and the at least one other content corresponding to at least part of the second information, updating a priority of the redundant content among the at least one content corresponding to the first information, and ranking the at least one content based on the updated priority.

An electronic device and its operating method according to various embodiments may provide a search service for various objects, by outputting information of at least one content corresponding to at least one object detected in an image.

An electronic device and its operating method according to various embodiments may reduce a searching time of a content corresponding to an object, by limiting a search range (e.g., a server, a storage area, etc.) of the content corresponding to the object based on at least one of shape or label information of the object in an image.

An electronic device and its operating method according to various embodiments may improve accuracy of a search service on an object, by ranking at least one content corresponding to an object of an image based on shape and additional information (e.g., text detection information) of the object.

The term "module", as used herein, includes a unit configured to hardware, software, or firmware. The term "module" can be interchangeably used with terms such as "logic", "logical block", "component", "circuit", or the like. A module can be an integral component, or a minimum unit for performing one or more functions or may be a part thereof. A module can be mechanically or electrically implemented. For example, a module, according to an embodiment of the present disclosure, can include an Application-Specific Integrated Circuit (ASIC) chip, a Field-Programmable Gate Arrays (FPGAs), or a programmable-logic device, which are known or will be developed and which perform certain operations.

At least some parts of a device (e.g., modules or functions thereof) or a method (e.g., operations), according to embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components.

Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The embodiments disclosed in this document are presented for explanations and understanding of the technical disclosure, and are not intended to limit the scope of various embodiments of the present invention. Accordingly, the scope of various embodiments of the present invention should be construed to include all changes or various other embodiments based on technical ideas of various embodiments of the present invention.

What is claimed is:

1. An electronic device comprising:
a camera;
a display;
at least one processor; and
a memory electrically coupled with the at least one processor,
wherein the memory stores instructions which, when executed, cause the at least one processor to:
acquire an image comprising an object through the camera,
identify first information relating to a shape of the object in the image,
identify second information relating to text information of the object, the text information comprising at least one word, wherein the second information is identified by selecting at least one portion of the text information based on at least one of size of the at least one word, a display position of the at least one word, a number of characters constituting the at least one word, a number of languages corresponding to the at least one word, a remove word list, or a distance between words,
based on obtaining at least one first content corresponding to the first information from a server, provide the at least one first content, through the display, in an arrangement on the display based at least in part on the second information, and
based on obtaining no first content corresponding to the first information from the server, obtain at least one second content from the server based on the second information and provide the at least one second content through the display.

2. The electronic device of claim 1, wherein the server comprises a plurality of storage areas,
wherein the instructions comprise instructions which cause the at least one processor to:
obtain at least first one content corresponding to the first information from at least one storage area corresponding to the shape information of the object among the plurality of the storage areas.

3. The electronic device of claim 1, wherein the instructions comprise instructions which cause the at least one processor to:
obtain, as the at least one first content, at least one product identification information corresponding to the first information from the server, and
obtain, as further first content, detailed information corresponding to the at least one product identification information from another external device.

4. The electronic device of claim 1, wherein the instructions comprise instructions which cause the at least one processor to:
detect the second information based one at least one of a text extracted from the image, a text corresponding to a label extracted from the image, or a text corresponding to a shape of the object.

5. The electronic device of claim 1, wherein the remove word list includes at least one word determined as unnecessary for object identification.

6. The electronic device of claim 1, wherein the arrangement of the at least one first content is based on priorities associated with the second information.

7. The electronic device of claim 1, wherein the instructions comprise instructions which cause the at least one processor to:
set a priority of the at least one first content based on similarity of the at least one first content and the first information,
update a priority of at least one first content based on the second information,
wherein the arrangement of the at least one content on the display is based on the updated priority.

8. The electronic device of claim 7, wherein the instructions comprise instructions which cause the at least one processor to:
based on no second content being obtained from the server based on the second information, obtain at least one third content corresponding to at least part of the second information from another external device, and
provide the at least one third content, through the display.

9. The electronic device of claim 1, wherein the instructions comprise instructions which cause the at least one processor to:
detect redundant content in the at least one first content,
update a priority of the redundant content among the at least one first content, and
provide the at least one first content, through the display, based on the updated priority.

10. A method for providing content of an electronic device, comprising:
acquiring an image comprising an object through a camera;
identifying first information relating to a shape of the object in the image;
identifying second information relating to text information of the object, the text information comprising at least one word, wherein the second information is identified by selecting at least one portion of the text information based on at least one of size of the at least one word, a display position of the at least one word, a number of characters constituting the at least one word, a number of languages corresponding to the at least one word, a remove word list, or a distance between words;
based on obtaining at least one first content corresponding to the first information from a server, providing the at least one first content, through the display, in an arrangement on the display based at least in part on the second information; and
based on obtaining no first content corresponding to the first information from the server, obtaining at least one second content from the server based on the second information and providing the at least one second content through the display.

11. The method of claim 10, further comprising:
obtaining, as the at least one first content, at least one product identification information corresponding to the first information, from the server; and
obtaining, as further first content, detailed information corresponding to the at least one product identification information from another external device.

12. The method of claim 10, wherein the remove word list includes at least one word determined as unnecessary for object identification.

13. The method of claim 10, further comprising:
setting a priority of the at least one first content based on similarity of the at least one first content and the first information;
updating a priority of the at least one first content based on the second information,
wherein the arrangement of the at least one content on the display is based on the updated priority.

14. The method of claim 13, further comprising:
- based on no second content being obtained from the server based on the second information, obtaining at least one third content corresponding to at least part of the second information from another external device; and
- providing the at least one third content, through the display.

* * * * *